（12） United States Patent
Hur et al.

(10) Patent No.: US 12,149,751 B2
(45) Date of Patent: Nov. 19, 2024

(54) TRANSFORM-BASED IMAGE CODING METHOD AND APPARATUS THEREFOR

(71) Applicant: LG ELECTRONICS INC., Seoul (KR)

(72) Inventors: Hyejung Hur, Seoul (KR); Sejin Oh, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 158 days.

(21) Appl. No.: 17/793,140

(22) PCT Filed: Dec. 15, 2020

(86) PCT No.: PCT/KR2020/018325
§ 371 (c)(1),
(2) Date: Jul. 15, 2022

(87) PCT Pub. No.: WO2021/145573
PCT Pub. Date: Jul. 22, 2021

(65) Prior Publication Data
US 2023/0059625 A1   Feb. 23, 2023

Related U.S. Application Data

(60) Provisional application No. 62/962,139, filed on Jan. 16, 2020.

(51) Int. Cl.
*H04N 19/96* (2014.01)
*G06T 9/40* (2006.01)
*H04N 19/91* (2014.01)

(52) U.S. Cl.
CPC ............. *H04N 19/96* (2014.11); *G06T 9/40* (2013.01); *H04N 19/91* (2014.11)

(58) Field of Classification Search
CPC ........... H04N 19/96; H04N 19/91; G06T 9/40
(Continued)

(56) References Cited

U.S. PATENT DOCUMENTS

2019/0080483 A1   3/2019   Mammou et al.
2019/0197739 A1*  6/2019   Sinharoy ................. G06T 9/00
2020/0107048 A1*  4/2020   Yea ..................... H04N 19/169

FOREIGN PATENT DOCUMENTS

JP   2018-518747 A   7/2018
KR   10-2017-0065587 A   6/2017

OTHER PUBLICATIONS

Khaled Mammou et al., "G-PCC codec description v2" International Organisation For Standardisation Organisation Internale De Normalisation ISO/IEC JTC1/SC29/WG11 Coding Of Moving Pictures And Audio, ISO/IEC JTC1/SC29/WG11 N18189, Jan. 2019, Marrakech, MA, 40 pages.

(Continued)

*Primary Examiner* — Allen C Wong
(74) *Attorney, Agent, or Firm* — Bryan Cave Leighton Paisner LLP

(57) ABSTRACT

A point cloud data processing method according to embodiments may comprise a step of encoding and transmitting point cloud data, wherein said encoding comprises encoding a geometry indicating the positions of one or more points of the point cloud data, the step of encoding a geometry further comprises a step of generating an octree of the geometry, and a step of encoding attributes of the one or more points comprises the steps of: generating Morton codes of the one or more points; and rearranging the one or more points on the basis of the octree to generate one or more levels of detail (LOD). The point cloud data processing method according to embodiments may comprise receiving and decoding point cloud data.

20 Claims, 27 Drawing Sheets

(58) Field of Classification Search
USPC .................................................. 375/240.23
See application file for complete search history.

(56) References Cited

OTHER PUBLICATIONS

Sebastian Schwarz et al., "Emerging MPEG Standards for Point Cloud Compression", IEEE Journal On Emerging And Selected Topics In Circuits And Systems, vol. 9, No. 1, Mar. 2019, pp. 133-148.

* cited by examiner

FIG. 7
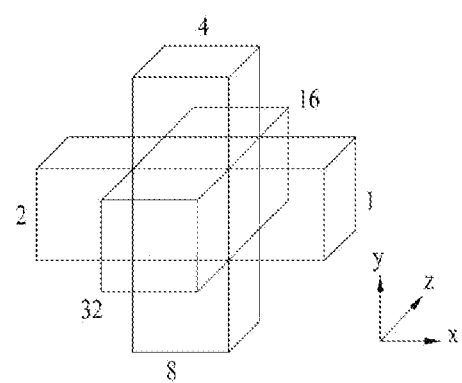
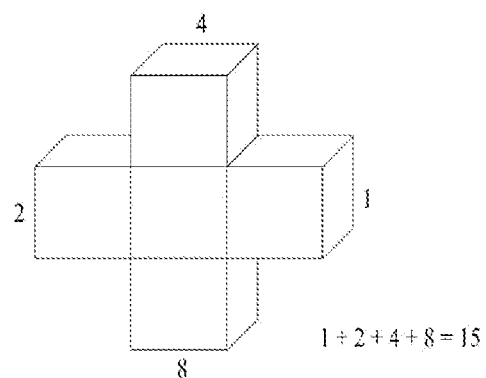

FIG. 22

| attribute_parameter_set( ) { | Descriptor |
|---|---|
|   aps_attr_parameter_set_id | ue(v) |
|   aps_seq_parameter_set_id | ue(v) |
|   ... | |
|   isLifting=(attr_coding_type = = 0 \|\| attr_coding_type = = 2) ? 1 : 0 | |
|   if(isLifting){ | |
|     lifting_num_pred_nearest_neighbours | ue(v) |
|     lifting_max_num_direct_predictors | ue(v) |
|     ... | |
|     different_nn_search_type_per_lod_flag | u(1) |
|     if(different_nn_search_type_per_lod_flag = = false) { | |
|       nearest_neighbour_search_type | u(2) |
|       if(nearest_neighbour_search_type==2) { | |
|         nearest_neighbour_search_range | u(16) |
|       } | |
|     }else{ | |
|       for( idx=0;idx <= num_detail_levels_minus1; idx++){ | |
|         nearest_neighbour_search_type[idx] | u(2) |
|         if(nearest_neighbour_search_type[idx]==2{ | |
|           nearest_neighbour_search_range[idx] | u(16) |
|         } | |
|       } | |
|     nearest_neighbour_search_type_per_tile_flag | u(1) |
|   } | |
|   ... | |
|   byte_alignment( ) | |
| } | |

FIG. 23

| tile_parameter_set( ) { | Descriptor |
|---|---|
| num_tiles | ue(v) |
| for( i=0; i < num_tiles; i++) { | |
|    tile_bounding_box_offset_x[i] | se(v) |
|    tile_bounding_box_offset_y[i] | se(v) |
|    ... | |
|    if(nearest_neighbour_search_type_per_tile_flag == true) { | |
|      different_nn_search_type_per_lod_flag | |
|      if(different_nn_search_type_per_lod_flag == false) { | |
|         nearest_neighbour_search_type | |
|         if(nearest_neighbour_search_type == 2) { | |
|            nearest_neighbour_search_range | |
|         } | |
|      } else { | |
|         for( idx=0; idx <= num_detail_levels_minus1; idx++) { | |
|            nearest_neighbour_search_type[idx] | |
|            if(nearest_neighbour_search_type[idx] == 2) { | |
|               nearest_neighbour_search_range[idx] | |
|            } | |
|         } | |
|      } | |
|    nearest_neighbour_search_type_per_slice_flag | |
|    ... | |
| } | |
| byte_alignment( ) | |
| } | |

2300

TRANSFORM-BASED IMAGE CODING METHOD AND APPARATUS THEREFOR

CROSS-REFERENCE TO RELATED APPLICATIONS

This application is a National Stage filing under 35 U.S.C. 371 of International Application No. PCT/KR2020/018325, with an international filing date of Dec. 15, 2020, which claims the benefit of U.S. Provisional Application No. 62/962,139, filed on Jan. 16, 2020, all of which are incorporated by reference in their entirety herein.

TECHNICAL FIELD

The present disclosure provides a method for providing point cloud contents to provide a user with various services such as virtual reality (VR), augmented reality (AR), mixed reality (MR), and self-driving services.

BACKGROUND ART

Point cloud content is content represented by a point cloud, which is a set of points belonging to a coordinate system representing a three-dimensional space. The point cloud content may express media configured in three dimensions, and is used to provide various services such as virtual reality (VR), augmented reality (AR), mixed reality (MR), and self-driving services. However, tens of thousands to hundreds of thousands of point data are required to represent point cloud content. Therefore, there is a need for a method for efficiently processing a large amount of point data.

DISCLOSURE

Technical Problem

Embodiments provide an apparatus and method for efficiently processing point cloud data. Embodiments provide a point cloud data processing method and apparatus for addressing latency and encoding/decoding complexity.

The technical scope of the embodiments is not limited to the aforementioned technical objects, and may be extended to other technical objects that may be inferred by those skilled in the art based on the entire contents disclosed herein.

Technical Solution

Accordingly, in some embodiments, in order to efficiently process point cloud data, a method of transmitting point cloud data includes encoding point cloud data and transmitting a bitstream including the encoded point cloud data.

In some embodiments, a method of receiving point cloud data includes receiving a bitstream including point cloud data and decoding the point cloud data.

Advantageous Effects

Apparatuses and methods according to embodiments may process point cloud data with high efficiency.

The apparatuses and methods according to the embodiments may provide a high-quality point cloud service.

The apparatuses and methods according to the embodiments may provide point cloud content for providing general-purpose services such as a VR service and a self-driving service.

DESCRIPTION OF DRAWINGS

The accompanying drawings, which are included to provide a further understanding of the disclosure and are incorporated in and constitute a part of this application, illustrate embodiment(s) of the disclosure and together with the description serve to explain the principle of the disclosure. For a better understanding of various embodiments described below, reference should be made to the description of the following embodiments in connection with the accompanying drawings. The same reference numbers will be used throughout the drawings to refer to the same or like parts.

FIG. 7 shows an example of a neighbor node pattern according to embodiments;

FIG. 22 shows a structure of an attribute parameter set (APS) of point cloud data according to embodiments;

FIG. 23 shows a structure of a tile parameter set (TPS) of point cloud data according to embodiments;

BEST MODE

Reference will now be made in detail to the preferred embodiments of the present disclosure, examples of which are illustrated in the accompanying drawings. The detailed description, which will be given below with reference to the accompanying drawings, is intended to explain exemplary embodiments of the present disclosure, rather than to show the only embodiments that may be implemented according to the present disclosure. The following detailed description includes specific details in order to provide a thorough understanding of the present disclosure. However, it will be apparent to those skilled in the art that the present disclosure may be practiced without such specific details.

Although most terms used in the present disclosure have been selected from general ones widely used in the art, some terms have been arbitrarily selected by the applicant and their meanings are explained in detail in the following description as needed. Thus, the present disclosure should be understood based upon the intended meanings of the terms rather than their simple names or meanings.

Figure 1:
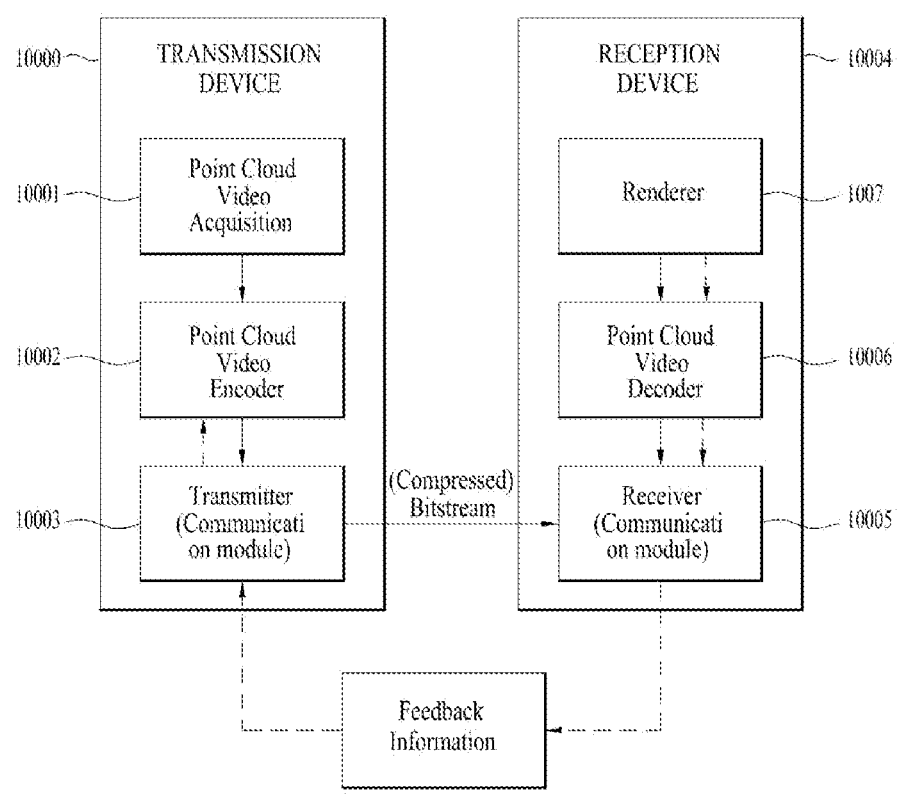
FIG. 1 shows an exemplary point cloud content providing system according to embodiments.

FIG. 1 shows an exemplary point cloud content providing system according to embodiments.

The point cloud content providing system illustrated in FIG. 1 may include a transmission device 10000 and a reception device 10004. The transmission device 10000 and the reception device 10004 are capable of wired or wireless communication to transmit and receive point cloud data.

The point cloud data transmission device 10000 according to the embodiments may secure and process point cloud video (or point cloud content) and transmit the same. According to embodiments, the transmission device 10000 may include a fixed station, a base transceiver system (BTS), a network, an artificial intelligence (AI) device and/or system, a robot, an AR/VR/XR device and/or server. According to embodiments, the transmission device 10000 may include a device, a robot, a vehicle, an AR/VR/XR device, a portable device, a home appliance, an Internet of Thing (IoT) device, and an AI device/server which are configured to perform communication with a base station and/or other wireless devices using a radio access technology (e.g., 5G New RAT (NR), Long Term Evolution (LTE)).

The transmission device 10000 according to the embodiments includes a point cloud video acquirer 10001, a point cloud video encoder 10002, and/or a transmitter (or communication module) 10003.

The point cloud video acquirer 10001 according to the embodiments acquires a point cloud video through a processing process such as capture, synthesis, or generation. The point cloud video is point cloud content represented by a point cloud, which is a set of points positioned in a 3D space, and may be referred to as point cloud video data. The point cloud video according to the embodiments may include one or more frames. One frame represents a still image/picture. Therefore, the point cloud video may include a point cloud image/frame/picture, and may be referred to as a point cloud image, frame, or picture.

The point cloud video encoder 10002 according to the embodiments encodes the acquired point cloud video data. The point cloud video encoder 10002 may encode the point cloud video data based on point cloud compression coding. The point cloud compression coding according to the embodiments may include geometry-based point cloud compression (G-PCC) coding and/or video-based point cloud compression (V-PCC) coding or next-generation coding. The point cloud compression coding according to the embodiments is not limited to the above-described embodiment. The point cloud video encoder 10002 may output a bitstream containing the encoded point cloud video data. The bitstream may contain not only the encoded point cloud video data, but also signaling information related to encoding of the point cloud video data.

The transmitter 10003 according to the embodiments transmits the bitstream containing the encoded point cloud video data. The bitstream according to the embodiments is encapsulated in a file or segment (for example, a streaming segment), and is transmitted over various networks such as a broadcasting network and/or a broadband network. Although not shown in the figure, the transmission device 10000 may include an encapsulator (or an encapsulation module) configured to perform an encapsulation operation. According to embodiments, the encapsulator may be included in the transmitter 10003. According to embodiments, the file or segment may be transmitted to the reception device 10004 over a network, or stored in a digital storage medium (e.g., USB, SD, CD, DVD, Blu-ray, HDD, SSD, etc.). The transmitter 10003 according to the embodiments is capable of wired/wireless communication with the reception device 10004 (or the receiver 10005) over a network of 4G, 5G, 6G, etc. In addition, the transmitter may perform a necessary data processing operation according to the network system (e.g., a 4G, 5G or 6G communication network system). The transmission device 10000 may transmit the encapsulated data in an on-demand manner.

The reception device 10004 according to the embodiments includes a receiver 10005, a point cloud video decoder 10006, and/or a renderer 10007. According to embodiments, the reception device 10004 may include a device, a robot, a vehicle, an AR/VR/XR device, a portable device, a home appliance, an Internet of Things (IoT) device, and an AI device/server which are configured to perform communication with a base station and/or other wireless devices using a radio access technology (e.g., 5G New RAT (NR), Long Term Evolution (LTE)).

The receiver 10005 according to the embodiments receives the bitstream containing the point cloud video data or the file/segment in which the bitstream is encapsulated from the network or storage medium. The receiver 10005 may perform necessary data processing according to the network system (for example, a communication network system of 4G, 5G, 6G, etc.). The receiver 10005 according to the embodiments may decapsulate the received file/segment and output a bitstream. According to embodiments, the receiver 10005 may include a decapsulator (or a decapsulation module) configured to perform a decapsulation operation. The decapsulator may be implemented as an element (or component) separate from the receiver 10005.

The point cloud video decoder 10006 decodes the bitstream containing the point cloud video data. The point cloud video decoder 10006 may decode the point cloud video data according to the method by which the point cloud video data is encoded (for example, in a reverse process of the operation of the point cloud video encoder 10002). Accordingly, the point cloud video decoder 10006 may decode the point cloud video data by performing point cloud decompression coding, which is the inverse process of the point cloud compression. The point cloud decompression coding includes G-PCC coding.

The renderer 10007 renders the decoded point cloud video data. The renderer 10007 may output point cloud content by rendering not only the point cloud video data but also audio data. According to embodiments, the renderer 10007 may include a display configured to display the point cloud content. According to embodiments, the display may be implemented as a separate device or component rather than being included in the renderer 10007.

The arrows indicated by dotted lines in the drawing represent a transmission path of feedback information acquired by the reception device 10004. The feedback information is information for reflecting interactivity with a user who consumes the point cloud content, and includes information about the user (e.g., head orientation information, viewport information, and the like). In particular, when the point cloud content is content for a service (e.g., self-driving service, etc.) that requires interaction with the user, the feedback information may be provided to the content transmitting side (e.g., the transmission device 10000) and/or the service provider. According to embodiments, the feedback information may be used in the reception device 10004 as well as the transmission device 10000, or may not be provided.

The head orientation information according to embodiments is information about the user's head position, orientation, angle, motion, and the like. The reception device 10004 according to the embodiments may calculate the viewport information based on the head orientation information. The viewport information may be information about a region of a point cloud video that the user is viewing. A viewpoint is a point through which the user is viewing the point cloud video, and may refer to a center point of the viewport region. That is, the viewport is a region centered on the viewpoint, and the size and shape of the region may be determined by a field of view (FOV). Accordingly, the reception device 10004 may extract the viewport information based on a vertical or horizontal FOV supported by the device in addition to the head orientation information. Also, the reception device 10004 performs gaze analysis or the like to check the way the user consumes a point cloud, a region that the user gazes at in the point cloud video, a gaze time, and the like. According to embodiments, the reception device 10004 may transmit feedback information including the result of the gaze analysis to the transmission device 10000. The feedback information according to the embodiments may be acquired in the rendering and/or display process. The feedback information according to the embodiments may be secured by one or more sensors included in the reception device 10004. According to embodiments, the feedback information may be secured by the renderer 10007 or a separate external element (or device, component, or the like). The dotted lines in FIG. 1 represent a process of transmitting the feedback information secured by the renderer 10007. The point cloud content providing system may process (encode/decode) point cloud data based on the feedback information. Accordingly, the point cloud video data decoder 10006 may perform a decoding operation based on the feedback information. The reception device 10004 may transmit the feedback information to the transmission device 10000. The transmission device 10000 (or the point cloud video data encoder 10002) may perform an encoding operation based on the feedback information. Accordingly, the point cloud content providing system may efficiently process necessary data (e.g., point cloud data corresponding to the user's head position) based on the feedback information rather than processing (encoding/decoding) the entire point cloud data, and provide point cloud content to the user.

According to embodiments, the transmission device 10000 may be called an encoder, a transmitting device, a transmitter, or the like, and the reception device 10004 may be called a decoder, a receiving device, a receiver, or the like.

The point cloud data processed in the point cloud content providing system of FIG. 1 according to embodiments (through a series of processes of acquisition/encoding/transmission/decoding/rendering) may be referred to as point cloud content data or point cloud video data. According to embodiments, the point cloud content data may be used as a concept covering metadata or signaling information related to the point cloud data.

The elements of the point cloud content providing system illustrated in FIG. 1 may be implemented by hardware, software, a processor, and/or a combination thereof.

Figure 2:
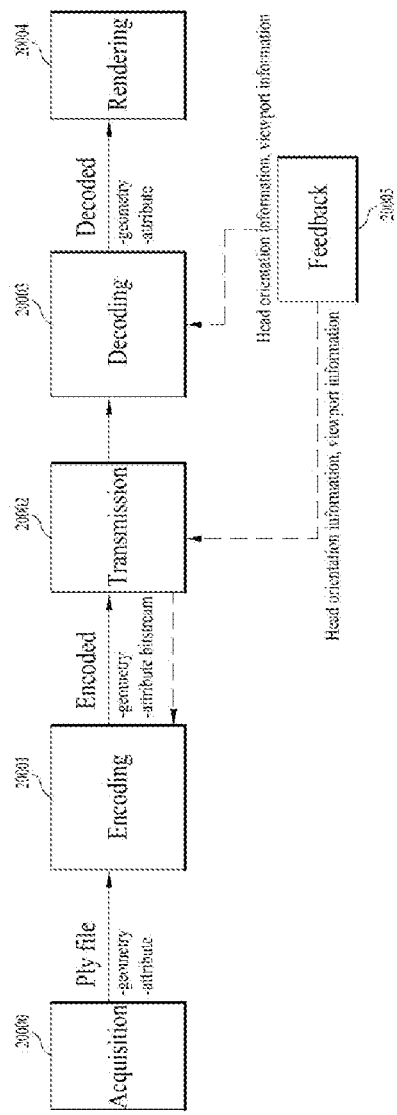
FIG. 2 is a block diagram illustrating a point cloud content providing operation according to embodiments.

FIG. 2 is a block diagram illustrating a point cloud content providing operation according to embodiments.

The block diagram of FIG. 2 shows the operation of the point cloud content providing system described in FIG. 1. As described above, the point cloud content providing system may process point cloud data based on point cloud compression coding (e.g., G-PCC).

The point cloud content providing system according to the embodiments (for example, the point cloud transmission device 10000 or the point cloud video acquirer 10001) may acquire a point cloud video (20000). The point cloud video is represented by a point cloud belonging to a coordinate system for expressing a 3D space. The point cloud video according to the embodiments may include a Ply (Polygon File format or the Stanford Triangle format) file. When the point cloud video has one or more frames, the acquired point cloud video may include one or more Ply files. The Ply files contain point cloud data, such as point geometry and/or attributes. The geometry includes positions of points. The position of each point may be represented by parameters (for example, values of the X, Y, and Z axes) representing a three-dimensional coordinate system (e.g., a coordinate system composed of X, Y and Z axes). The attributes include attributes of points (e.g., information about texture, color (in YCbCr or RGB), reflectance r, transparency, etc. of each point). A point has one or more attributes. For example, a point may have an attribute that is a color, or two attributes that are color and reflectance. According to embodiments, the geometry may be called positions, geometry information, geometry data, or the like, and the attribute may be called attributes, attribute information, attribute data, or the like. The point cloud content providing system (for example, the point cloud transmission device 10000 or the point cloud video acquirer 10001) may secure point cloud data from information (e.g., depth information, color information, etc.) related to the acquisition process of the point cloud video.

The point cloud content providing system (for example, the transmission device 10000 or the point cloud video encoder 10002) according to the embodiments may encode the point cloud data (20001). The point cloud content providing system may encode the point cloud data based on point cloud compression coding. As described above, the point cloud data may include the geometry and attributes of a point. Accordingly, the point cloud content providing system may perform geometry encoding of encoding the geometry and output a geometry bitstream. The point cloud content providing system may perform attribute encoding of encoding attributes and output an attribute bitstream. According to embodiments, the point cloud content providing system may perform the attribute encoding based on the geometry encoding. The geometry bitstream and the attribute bitstream according to the embodiments may be multiplexed and output as one bitstream. The bitstream according to the embodiments may further contain signaling information related to the geometry encoding and attribute encoding.

The point cloud content providing system (for example, the transmission device 10000 or the transmitter 10003) according to the embodiments may transmit the encoded point cloud data (20002). As illustrated in FIG. 1, the encoded point cloud data may be represented by a geometry bitstream and an attribute bitstream. In addition, the encoded point cloud data may be transmitted in the form of a bitstream together with signaling information related to encoding of the point cloud data (for example, signaling information related to the geometry encoding and the attribute encoding). The point cloud content providing system may encapsulate a bitstream that carries the encoded point cloud data and transmit the same in the form of a file or segment.

The point cloud content providing system (for example, the reception device 10004 or the receiver 10005) according to the embodiments may receive the bitstream containing the encoded point cloud data. In addition, the point cloud content providing system (for example, the reception device 10004 or the receiver 10005) may demultiplex the bitstream.

The point cloud content providing system (e.g., the reception device 10004 or the point cloud video decoder 10005) may decode the encoded point cloud data (e.g., the geometry bitstream, the attribute bitstream) transmitted in the bitstream. The point cloud content providing system (for example, the reception device 10004 or the point cloud video decoder 10005) may decode the point cloud video data based on the signaling information related to encoding of the point cloud video data contained in the bitstream. The point cloud content providing system (for example, the reception device 10004 or the point cloud video decoder 10005) may decode the geometry bitstream to reconstruct the positions (geometry) of points. The point cloud content providing system may reconstruct the attributes of the points by decoding the attribute bitstream based on the reconstructed geometry. The point cloud content providing system (for example, the reception device 10004 or the point cloud video decoder 10005) may reconstruct the point cloud video based on the positions according to the reconstructed geometry and the decoded attributes.

The point cloud content providing system according to the embodiments (for example, the reception device 10004 or the renderer 10007) may render the decoded point cloud data (20004). The point cloud content providing system (for example, the reception device 10004 or the renderer 10007) may render the geometry and attributes decoded through the decoding process, using various rendering methods. Points in the point cloud content may be rendered to a vertex having a certain thickness, a cube having a specific minimum size centered on the corresponding vertex position, or a circle centered on the corresponding vertex position. All or part of the rendered point cloud content is provided to the user through a display (e.g., a VR/AR display, a general display, etc.).

The point cloud content providing system (for example, the reception device 10004) according to the embodiments may secure feedback information (20005). The point cloud content providing system may encode and/or decode point cloud data based on the feedback information. The feedback information and the operation of the point cloud content providing system according to the embodiments are the same as the feedback information and the operation described with reference to FIG. 1, and thus detailed description thereof is omitted.

Figure 3:
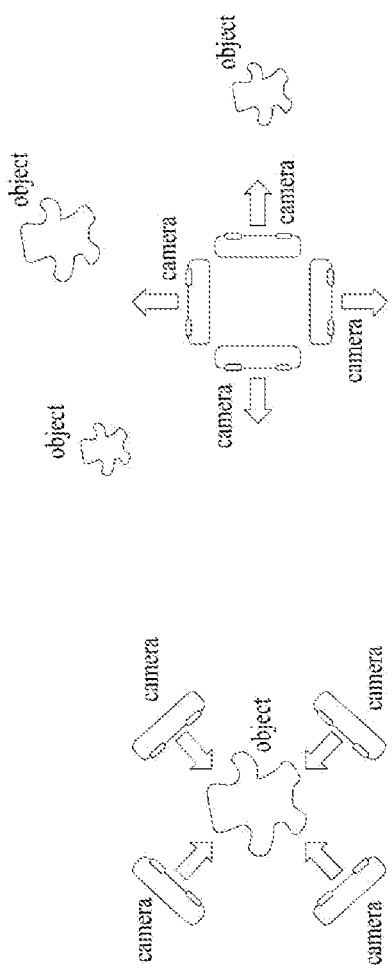
FIG. 3 illustrates an exemplary process of capturing a point cloud video according to embodiments.

FIG. 3 illustrates an exemplary process of capturing a point cloud video according to embodiments.

FIG. 3 illustrates an exemplary point cloud video capture process of the point cloud content providing system described with reference to FIGS. 1 to 2.

Point cloud content includes a point cloud video (images and/or videos) representing an object and/or environment located in various 3D spaces (e.g., a 3D space representing a real environment, a 3D space representing a virtual environment, etc.). Accordingly, the point cloud content providing system according to the embodiments may capture a point cloud video using one or more cameras (e.g., an infrared camera capable of securing depth information, an RGB camera capable of extracting color information corresponding to the depth information, etc.), a projector (e.g., an infrared pattern projector to secure depth information), a LiDAR, or the like. The point cloud content providing system according to the embodiments may extract the shape of geometry composed of points in a 3D space from the depth information and extract the attributes of each point from the color information to secure point cloud data. An image and/or video according to the embodiments may be captured based on at least one of the inward-facing technique and the outward-facing technique.

The left part of FIG. 3 illustrates the inward-facing technique. The inward-facing technique refers to a technique of capturing images a central object with one or more cameras (or camera sensors) positioned around the central object. The inward-facing technique may be used to generate point cloud content providing a 360-degree image of a key object to the user (e.g., VR/AR content providing a 360-degree image of an object (e.g., a key object such as a character, player, object, or actor) to the user).

The right part of FIG. 3 illustrates the outward-facing technique. The outward-facing technique refers to a technique of capturing images an environment of a central object rather than the central object with one or more cameras (or camera sensors) positioned around the central object. The outward-facing technique may be used to generate point cloud content for providing a surrounding environment that appears from the user's point of view (e.g., content representing an external environment that may be provided to a user of a self-driving vehicle).

As shown in the figure, the point cloud content may be generated based on the capturing operation of one or more cameras. In this case, the coordinate system may differ among the cameras, and accordingly the point cloud content providing system may calibrate one or more cameras to set a global coordinate system before the capturing operation. In addition, the point cloud content providing system may generate point cloud content by synthesizing an arbitrary image and/or video with an image and/or video captured by the above-described capture technique. The point cloud content providing system may not perform the capturing operation described in FIG. 3 when it generates point cloud content representing a virtual space. The point cloud content providing system according to the embodiments may perform post-processing on the captured image and/or video. In other words, the point cloud content providing system may remove an unwanted area (for example, a background), recognize a space to which the captured images and/or videos are connected, and, when there is a spatial hole, perform an operation of filling the spatial hole.

The point cloud content providing system may generate one piece of point cloud content by performing coordinate transformation on points of the point cloud video secured from each camera. The point cloud content providing system may perform coordinate transformation on the points based on the coordinates of the position of each camera. Accordingly, the point cloud content providing system may generate content representing one wide range, or may generate point cloud content having a high density of points.

Figure 4:
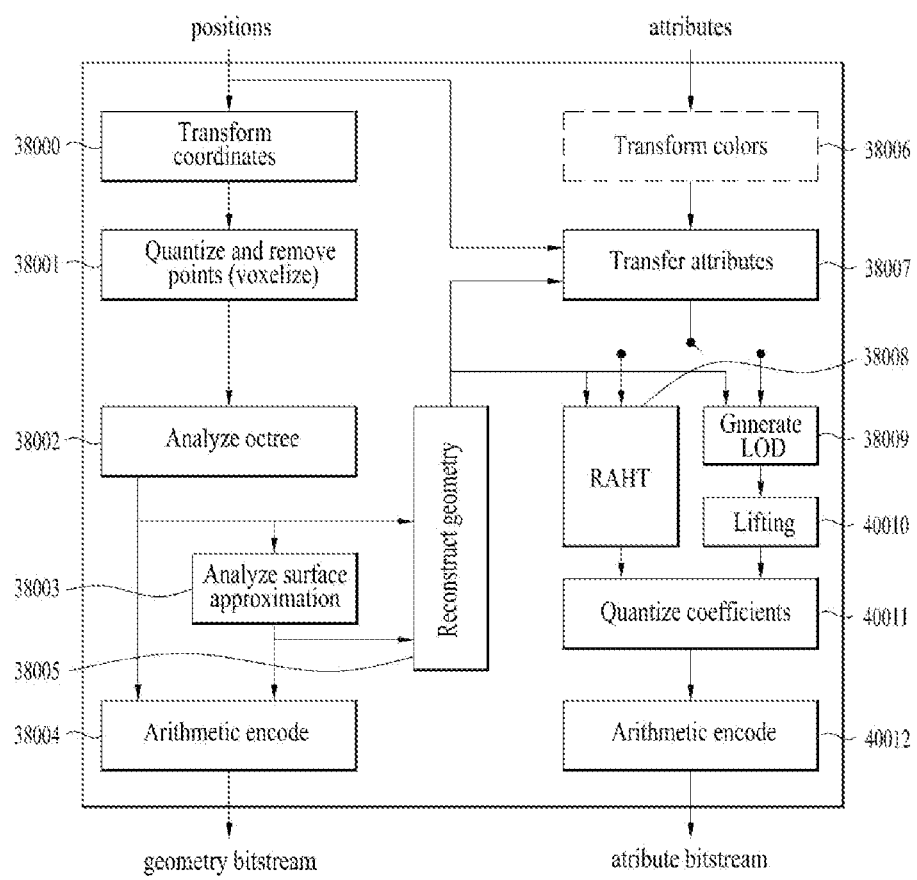
FIG. 4 illustrates an exemplary point cloud encoder according to embodiments.

FIG. 4 illustrates an exemplary point cloud encoder according to embodiments.

FIG. 4 shows an example of the point cloud video encoder 10002 of FIG. 1. The point cloud encoder reconstructs and encodes point cloud data (e.g., positions and/or attributes of the points) to adjust the quality of the point cloud content (to, for example, lossless, lossy, or near-lossless) according to the network condition or applications. When the overall size of the point cloud content is large (e.g., point cloud content of 60 Gbps is given for 30 fps), the point cloud content providing system may fail to stream the content in real time. Accordingly, the point cloud content providing system may reconstruct the point cloud content based on the maximum target bitrate to provide the same in accordance with the network environment or the like.

As described with reference to FIGS. 1 to 2, the point cloud encoder may perform geometry encoding and attribute encoding. The geometry encoding is performed before the attribute encoding.

The point cloud encoder according to the embodiments includes a coordinate transformer (Transform coordinates) 40000, a quantizer (Quantize and remove points (voxelize)) 40001, an octree analyzer (Analyze octree) 40002, and a surface approximation analyzer (Analyze surface approximation) 40003, an arithmetic encoder (Arithmetic encode) 40004, a geometric reconstructor (Reconstruct geometry) 40005, a color transformer (Transform colors) 40006, an attribute transformer (Transform attributes) 40007, a RAHT transformer (RAHT) 40008, an LOD generator (Generate LOD) 40009, a lifting transformer (Lifting) 40010, a coefficient quantizer (Quantize coefficients) 40011, and/or an arithmetic encoder (Arithmetic encode) 40012.

The coordinate transformer 40000, the quantizer 40001, the octree analyzer 40002, the surface approximation analyzer 40003, the arithmetic encoder 40004, and the geometry reconstructor 40005 may perform geometry encoding. The geometry encoding according to the embodiments may include octree geometry coding, direct coding, trisoup geometry encoding, and entropy encoding. The direct coding and trisoup geometry encoding are applied selectively or in combination. The geometry encoding is not limited to the above-described example.

As shown in the figure, the coordinate transformer 40000 according to the embodiments receives positions and transforms the same into coordinates. For example, the positions may be transformed into position information in a three-dimensional space (for example, a three-dimensional space represented by an XYZ coordinate system). The position information in the three-dimensional space according to the embodiments may be referred to as geometry information.

The quantizer 40001 according to the embodiments quantizes the geometry. For example, the quantizer 40001 may quantize the points based on a minimum position value of all points (for example, a minimum value on each of the X, Y, and Z axes). The quantizer 40001 performs a quantization operation of multiplying the difference between the minimum position value and the position value of each point by a preset quantization scale value and then finding the nearest integer value by rounding the value obtained through the multiplication. Thus, one or more points may have the same quantized position (or position value). The quantizer 40001 according to the embodiments performs voxelization based on the quantized positions to reconstruct quantized points. As in the case of a pixel, which is the minimum unit containing 2D image/video information, points of point cloud content (or 3D point cloud video) according to the embodiments may be included in one or more voxels. The term voxel, which is a compound of volume and pixel, refers to a 3D cubic space generated when a 3D space is divided into units (unit=1.0) based on the axes representing the 3D space (e.g., X-axis, Y-axis, and Z-axis). The quantizer 40001 may match groups of points in the 3D space with voxels. According to embodiments, one voxel may include only one point. According to embodiments, one voxel may include one or more points. In order to express one voxel as one point, the position of the center of a voxel may be set based on the positions of one or more points included in the voxel. In this case, attributes of all positions included in one voxel may be combined and assigned to the voxel.

The octree analyzer 40002 according to the embodiments performs octree geometry coding (or octree coding) to present voxels in an octree structure. The octree structure represents points matched with voxels, based on the octal tree structure.

The surface approximation analyzer 40003 according to the embodiments may analyze and approximate the octree. The octree analysis and approximation according to the embodiments is a process of analyzing a region containing a plurality of points to efficiently provide octree and voxelization.

The arithmetic encoder 40004 according to the embodiments performs entropy encoding on the octree and/or the approximated octree. For example, the encoding scheme includes arithmetic encoding. As a result of the encoding, a geometry bitstream is generated.

The color transformer 40006, the attribute transformer 40007, the RAHT transformer 40008, the LOD generator 40009, the lifting transformer 40010, the coefficient quantizer 40011, and/or the arithmetic encoder 40012 perform attribute encoding. As described above, one point may have one or more attributes. The attribute encoding according to the embodiments is equally applied to the attributes that one point has. However, when an attribute (e.g., color) includes one or more elements, attribute encoding is independently applied to each element. The attribute encoding according to the embodiments includes color transform coding, attribute transform coding, region adaptive hierarchical transform (RAHT) coding, interpolation-based hierarchical nearest-neighbor prediction (prediction transform) coding, and interpolation-based hierarchical nearest-neighbor prediction with an update/lifting step (lifting transform) coding. Depending on the point cloud content, the RAHT coding, the prediction transform coding and the lifting transform coding described above may be selectively used, or a combination of one or more of the coding schemes may be used. The attribute encoding according to the embodiments is not limited to the above-described example.

The color transformer 40006 according to the embodiments performs color transform coding of transforming color values (or textures) included in the attributes. For example, the color transformer 40006 may transform the format of color information (for example, from RGB to YCbCr). The operation of the color transformer 40006 according to embodiments may be optionally applied according to the color values included in the attributes.

The geometry reconstructor 40005 according to the embodiments reconstructs (decompresses) the octree and/or the approximated octree. The geometry reconstructor 40005 reconstructs the octree/voxels based on the result of analyzing the distribution of points. The reconstructed octree/voxels may be referred to as reconstructed geometry (restored geometry).

The attribute transformer 40007 according to the embodiments performs attribute transformation to transform the attributes based on the reconstructed geometry and/or the positions on which geometry encoding is not performed. As described above, since the attributes are dependent on the geometry, the attribute transformer 40007 may transform the attributes based on the reconstructed geometry information. For example, based on the position value of a point included in a voxel, the attribute transformer 40007 may transform the attribute of the point at the position. As described above, when the position of the center of a voxel is set based on the positions of one or more points included in the voxel, the attribute transformer 40007 transforms the attributes of the one or more points. When the trisoup geometry encoding is performed, the attribute transformer 40007 may transform the attributes based on the trisoup geometry encoding.

The attribute transformer 40007 may perform the attribute transformation by calculating the average of attributes or attribute values of neighboring points (e.g., color or reflectance of each point) within a specific position/radius from the position (or position value) of the center of each voxel. The attribute transformer 40007 may apply a weight according to the distance from the center to each point in calculating the average. Accordingly, each voxel has a position and a calculated attribute (or attribute value).

The attribute transformer 40007 may search for neighboring points existing within a specific position/radius from the position of the center of each voxel based on the K-D tree or the Morton code. The K-D tree is a binary search tree and supports a data structure capable of managing points based on the positions such that nearest neighbor search (NNS) can be performed quickly. The Morton code is generated by presenting coordinates (e.g., (x, y, z)) representing 3D positions of all points as bit values and mixing the bits. For example, when the coordinates representing the position of a point are (5, 9, 1), the bit values for the coordinates are (0101, 1001, 0001). Mixing the bit values according to the bit index in order of z, y, and x yields 010001000111. This value is expressed as a decimal number of 1095. That is, the Morton code value of the point having coordinates (5, 9, 1) is 1095. The attribute transformer 40007 may order the points based on the Morton code values and perform NNS through a depth-first traversal process. After the attribute transformation operation, the K-D tree or the Morton code is used when the NNS is needed in another transformation process for attribute coding.

As shown in the figure, the transformed attributes are input to the RAHT transformer 40008 and/or the LOD generator 40009.

The RAHT transformer 40008 according to the embodiments performs RAHT coding for predicting attribute information based on the reconstructed geometry information. For example, the RAHT transformer 40008 may predict attribute information of a node at a higher level in the octree based on the attribute information associated with a node at a lower level in the octree.

The LOD generator 40009 according to the embodiments generates a level of detail (LOD) to perform prediction transform coding. The LOD according to the embodiments is a degree of detail of point cloud content. As the LOD value decrease, it indicates that the detail of the point cloud content is degraded. As the LOD value increases, it indicates that the detail of the point cloud content is enhanced. Points may be classified by the LOD.

The lifting transformer 40010 according to the embodiments performs lifting transform coding of transforming the attributes a point cloud based on weights. As described above, lifting transform coding may be optionally applied.

The coefficient quantizer 40011 according to the embodiments quantizes the attribute-coded attributes based on coefficients.

The arithmetic encoder 40012 according to the embodiments encodes the quantized attributes based on arithmetic coding.

Although not shown in the figure, the elements of the point cloud encoder of FIG. 4 may be implemented by hardware including one or more processors or integrated circuits configured to communicate with one or more memories included in the point cloud providing apparatus, software, firmware, or a combination thereof. The one or more processors may perform at least one of the operations and/or functions of the elements of the point cloud encoder of FIG. 4 described above. Additionally, the one or more processors may operate or execute a set of software programs and/or instructions for performing the operations and/or functions of the elements of the point cloud encoder of FIG. 4. The one or more memories according to the embodiments may include a high speed random access memory, or include a non-volatile memory (e.g., one or more magnetic disk storage devices, flash memory devices, or other non-volatile solid-state memory devices).

Figure 5:
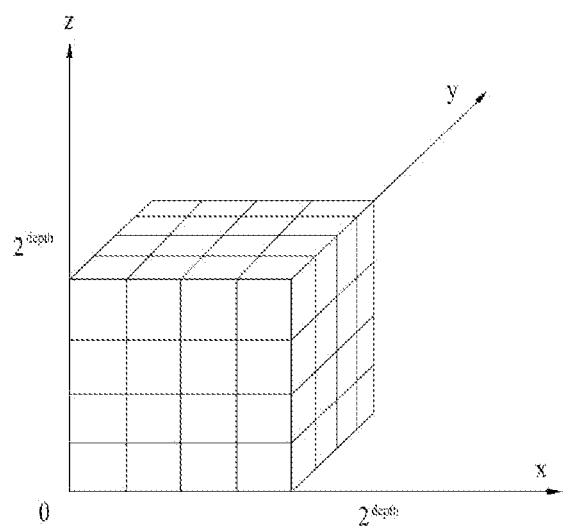
FIG. 5 shows an example of voxels according to embodiments.

FIG. 5 shows an example of voxels according to embodiments.

FIG. 5 shows voxels positioned in a 3D space represented by a coordinate system composed of three axes, which are the X-axis, the Y-axis, and the Z-axis. As described with reference to FIG. 4, the point cloud encoder (e.g., the quantizer 40001) may perform voxelization. Voxel refers to a 3D cubic space generated when a 3D space is divided into units (unit=1.0) based on the axes representing the 3D space (e.g., X-axis, Y-axis, and Z-axis). FIG. 5 shows an example of voxels generated through an octree structure in which a cubical axis-aligned bounding box defined by two poles (0, 0, 0) and (2d, 2d, 2d) is recursively subdivided. One voxel includes at least one point. The spatial coordinates of a voxel may be estimated from the positional relationship with a voxel group. As described above, a voxel has an attribute (such as color or reflectance) like pixels of a 2D image/video. The details of the voxel are the same as those described with reference to FIG. 4, and therefore a description thereof is omitted.

Figure 6:
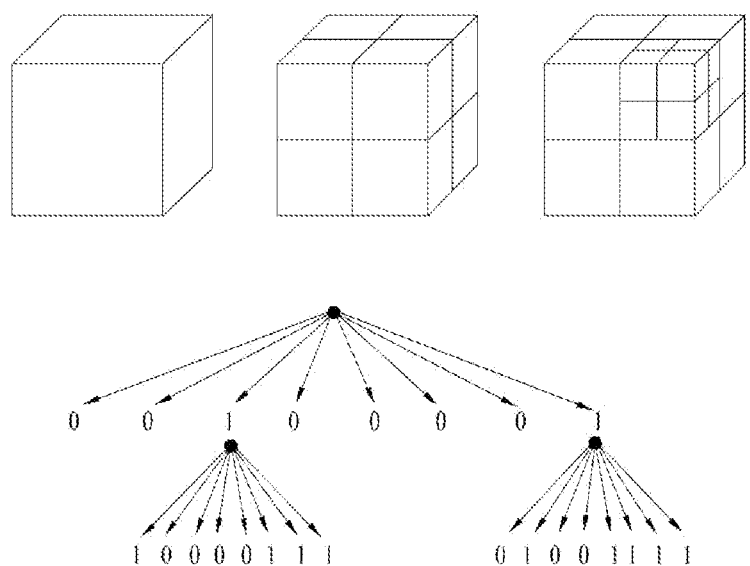
FIG. 6 shows an example of an octree and occupancy code according to embodiments.

FIG. 6 shows an example of an octree and occupancy code according to embodiments.

As described with reference to FIGS. 1 to 4, the point cloud content providing system (point cloud video encoder 10002) or the point cloud encoder (for example, the octree analyzer 40002) performs octree geometry coding (or octree coding) based on an octree structure to efficiently manage the region and/or position of the voxel.

The upper part of FIG. 6 shows an octree structure. The 3D space of the point cloud content according to the embodiments is represented by axes (e.g., X-axis, Y-axis, and Z-axis) of the coordinate system. The octree structure is created by recursive subdividing of a cubical axis-aligned bounding box defined by two poles (0, 0, 0) and (2d, 2d, 2d), Here, 2d may be set to a value constituting the smallest bounding box surrounding all points of the point cloud content (or point cloud video). Here, d denotes the depth of the octree. The value of d is determined in the following equation. In the following equation, (xintn, yintn, zintn) denotes the positions (or position values) of quantized points.

$$d = \text{Cell}(\text{Log2}(\text{Max}(x_n^{int}, y_n^{int}, z_n^{int}, n=1, \ldots, N)+1))$$

As shown in the middle of the upper part of FIG. 6, the entire 3D space may be divided into eight spaces according to partition. Each divided space is represented by a cube with six faces. As shown in the upper right of FIG. 6, each of the eight spaces is divided again based on the axes of the coordinate system (e.g., X-axis, Y-axis, and Z-axis). Accordingly, each space is divided into eight smaller spaces. The divided smaller space is also represented by a cube with six faces. This partitioning scheme is applied until the leaf node of the octree becomes a voxel.

The lower part of FIG. 6 shows an octree occupancy code. The occupancy code of the octree is generated to indicate whether each of the eight divided spaces generated by dividing one space contains at least one point. Accordingly, a single occupancy code is represented by eight child nodes. Each child node represents the occupancy of a divided space, and the child node has a value in 1 bit. Accordingly, the occupancy code is represented as an 8-bit code. That is, when at least one point is contained in the space corresponding to a child node, the node is assigned a value of 1. When no point is contained in the space corresponding to the child node (the space is empty), the node is assigned a value of 0. Since the occupancy code shown in FIG. 6 is 00100001, it indicates that the spaces corresponding to the third child node and the eighth child node among the eight child nodes each contain at least one point. As shown in the figure, each of the third child node and the eighth child node has eight child nodes, and the child nodes are represented by an 8-bit occupancy code. The figure shows that the occupancy code of the third child node is 10000111, and the occupancy code of the eighth child node is 01001111. The point cloud encoder (for example, the arithmetic encoder 40004) according to the embodiments may perform entropy encoding on the occupancy codes. In order to increase the compression efficiency, the point cloud encoder may perform intra/inter-coding on the occupancy codes. The reception device (for example, the reception device 10004 or the point cloud video decoder 10006) according to the embodiments reconstructs the octree based on the occupancy codes.

The point cloud encoder (for example, the point cloud encoder of FIG. 4 or the octree analyzer 40002) according to the embodiments may perform voxelization and octree coding to store the positions of points. However, points are not always evenly distributed in the 3D space, and accordingly there may be a specific region in which fewer points are present. Accordingly, it is inefficient to perform voxelization for the entire 3D space. For example, when a specific region contains few points, voxelization does not need to be performed in the specific region.

Accordingly, for the above-described specific region (or a node other than the leaf node of the octree), the point cloud encoder according to the embodiments may skip voxelization and perform direct coding to directly code the positions of points included in the specific region. The coordinates of a direct coding point according to the embodiments are referred to as direct coding mode (DCM). The point cloud encoder according to the embodiments may also perform trisoup geometry encoding, which is to reconstruct the positions of the points in the specific region (or node) based on voxels, based on a surface model. The trisoup geometry encoding is geometry encoding that represents an object as a series of triangular meshes. Accordingly, the point cloud decoder may generate a point cloud from the mesh surface. The direct coding and trisoup geometry encoding according to the embodiments may be selectively performed. In addition, the direct coding and trisoup geometry encoding according to the embodiments may be performed in combination with octree geometry coding (or octree coding).

To perform direct coding, the option to use the direct mode for applying direct coding should be activated. A node to which direct coding is to be applied is not a leaf node, and points less than a threshold should be present within a specific node. In addition, the total number of points to which direct coding is to be applied should not exceed a preset threshold. When the conditions above are satisfied, the point cloud encoder (or the arithmetic encoder 40004) according to the embodiments may perform entropy coding on the positions (or position values) of the points.

The point cloud encoder (for example, the surface approximation analyzer 40003) according to the embodiments may determine a specific level of the octree (a level less than the depth d of the octree), and the surface model may be used staring with that level to perform trisoup geometry encoding to reconstruct the positions of points in the region of the node based on voxels (Trisoup mode). The point cloud encoder according to the embodiments may specify a level at which trisoup geometry encoding is to be applied. For example, when the specific level is equal to the depth of the octree, the point cloud encoder does not operate in the trisoup mode. In other words, the point cloud encoder according to the embodiments may operate in the trisoup mode only when the specified level is less than the value of depth of the octree. The 3D cube region of the nodes at the specified level according to the embodiments is called a block. One block may include one or more voxels. The block or voxel may correspond to a brick. Geometry is represented as a surface within each block. The surface according to embodiments may intersect with each edge of a block at most once.

One block has 12 edges, and accordingly there are at least 12 intersections in one block. Each intersection is called a vertex (or apex). A vertex present along an edge is detected when there is at least one occupied voxel adjacent to the edge among all blocks sharing the edge. The occupied voxel according to the embodiments refers to a voxel containing a point. The position of the vertex detected along the edge is the average position along the edge of all voxels adjacent to the edge among all blocks sharing the edge.

Once the vertex is detected, the point cloud encoder according to the embodiments may perform entropy encoding on the starting point (x, y, z) of the edge, the direction vector (Δx, Δy, Δz) of the edge, and the vertex position value (relative position value within the edge). When the trisoup geometry encoding is applied, the point cloud encoder according to the embodiments (for example, the geometry reconstructor 40005) may generate restored geometry (reconstructed geometry) by performing the triangle reconstruction, up-sampling, and voxelization processes.

The vertices positioned at the edge of the block determine a surface that passes through the block. The surface according to the embodiments is a non-planar polygon. In the triangle reconstruction process, a surface represented by a triangle is reconstructed based on the starting point of the edge, the direction vector of the edge, and the position values of the vertices. The triangle reconstruction process is performed by: i) calculating the centroid value of each vertex, ii) subtracting the center value from each vertex value, and iii) estimating the sum of the squares of the values obtained by the subtraction.

$$\begin{bmatrix} \mu_x \\ \mu_y \\ \mu_z \end{bmatrix} = \frac{1}{n}\sum_{i=1}^{n} \begin{bmatrix} x_i \\ y_i \\ z_i \end{bmatrix}; \quad \text{i)}$$

$$\begin{bmatrix} \overline{x}_i \\ \overline{y}_i \\ \overline{z}_i \end{bmatrix} = \begin{bmatrix} x_i \\ y_i \\ z_i \end{bmatrix} - \begin{bmatrix} \mu_x \\ \mu_y \\ \mu_z \end{bmatrix}; \quad \text{ii)}$$

$$\begin{bmatrix} \sigma_x^2 \\ \sigma_y^2 \\ \sigma_z^2 \end{bmatrix} = \sum_{i=1}^{n} \begin{bmatrix} \overline{x}_i^2 \\ \overline{y}_i^2 \\ \overline{z}_i^2 \end{bmatrix} \quad \text{iii)}$$

The minimum value of the sum is estimated, and the projection process is performed according to the axis with the minimum value. For example, when the element x is the minimum, each vertex is projected on the x-axis with respect to the center of the block, and projected on the (y, z) plane. When the values obtained through projection on the (y, z) plane are (ai, bi), the value of θ is estimated through a tan 2(bi, ai), and the vertices are ordered based on the value of θ. The table below shows a combination of vertices for creating a triangle according to the number of the vertices. The vertices are ordered from 1 to n. The table below shows that for four vertices, two triangles may be constructed according to combinations of vertices. The first triangle may consist of vertices 1, 2, and 3 among the ordered vertices, and the second triangle may consist of vertices 3, 4, and 1 among the ordered vertices.

TABLE Triangles formed from vertices ordered 1, . . . , n

TABLE 1

| n | Triangles |
|---|---|
| 3 | (1, 2, 3) |
| 4 | (1, 2, 3), (3, 4, 1) |
| 5 | (1, 2, 3), (3, 4, 5), (5, 1, 3) |
| 6 | (1, 2, 3), (3, 4, 5), (5, 6, 1), (1, 3, 5) |
| 7 | (1, 2, 3), (3, 4, 5), (5, 6, 7), (7, 1, 3), (3, 5, 7) |
| 8 | (1, 2, 3), (3, 4, 5), (5, 6, 7), (7, 8, 1), (1, 3, 5), (5, 7, 1) |
| 9 | (1, 2, 3), (3, 4, 5), (5, 6, 7), (7, 8, 9), (9, 1, 3), (3, 5, 7), (7, 9, 3) |
| 10 | (1, 2, 3), (3, 4, 5), (5, 6, 7), (7, 8, 9), (9, 10, 1), (1, 3, 5), (5, 7, 9), (9, 1, 5) |
| 11 | (1, 2, 3), (3, 4, 5), (5, 6, 7), (7, 8, 9), (9, 10, 11), (11, 1, 3), (3, 5, 7), (7, 9, 11), (11, 3, 7) |
| 12 | (1, 2, 3), (3, 4, 5), (5, 6, 7), (7, 8, 9), (9, 10, 11), (11, 12, 1), (1, 3, 5), (5, 7, 9), (9, 11,1), (1, 5, 9) |

The upsampling process is performed to add points in the middle along the edge of the triangle and perform voxelization. The added points are generated based on the upsampling factor and the width of the block. The added points are called refined vertices. The paint cloud encoder according to the embodiments may voxelize the refined vertices. In addition, the point cloud encoder may perform attribute encoding based on the voxelized positions (or position values).

In order to increase the compression efficiency of the point cloud video, the point cloud encoder according to the embodiments may perform entropy coding based on context adaptive arithmetic coding.

As described with reference to FIGS. 1 to 6, the point cloud content providing system or the point cloud encoder (for example, the point cloud video encoder 10002, the point cloud encoder or arithmetic encoder 40004 FIG. 4) may perform entropy coding on the occupancy code immediately. In addition, the point cloud content providing system or the point cloud encoder may perform entropy encoding (intra encoding) based on the occupancy code of the current node and the occupancy of neighboring nodes, or perform entropy encoding (inter encoding) based on the occupancy code of the previous frame. A frame according to embodiments represents a set of point cloud videos generated at the same time. The compression efficiency of intra encoding/inter encoding according to the embodiments may depend on the number of neighboring nodes that are referenced. When the bits increase, the operation becomes complicated, but the encoding may be biased to one side, which may increase the compression efficiency. For example, when a 3-bit context is given, coding needs to be performed using 23=8 methods. The part divided for coding affects the complexity of implementation. Accordingly, it is necessary to meet an appropriate level of compression efficiency and complexity.

FIG. 7 illustrates a process of obtaining an occupancy pattern based on the occupancy of neighbor nodes. The point cloud encoder according to the embodiments determines occupancy of neighbor nodes of each node of the octree and obtains a value of a neighbor pattern. The neighbor node pattern is used to infer the occupancy pattern of the node. The upper part of FIG. 7 shows a cube corresponding to a node (a cube positioned in the middle) and six cubes (neighbor nodes) sharing at least one face with the cube. The nodes shown in the figure are nodes of the same depth. The numbers shown in the figure represent weights (1, 2, 4, 8, 16, and 32) associated with the six nodes, respectively. The weights are assigned sequentially according to the positions of neighboring nodes.

The lower part of FIG. 7 shows neighbor node pattern values. A neighbor node pattern value is the sum of values multiplied by the weight of an occupied neighbor node (a neighbor node having a point). Accordingly, the neighbor node pattern values are 0 to 63. When the neighbor node pattern value is 0, it indicates that there is no node having a point (no occupied node) among the neighbor nodes of the node. When the neighbor node pattern value is 63, it indicates that all neighbor nodes are occupied nodes. As shown in the figure, since neighbor nodes to which weights 1, 2, 4, and 8 are assigned are occupied nodes, the neighbor node pattern value is 15, the sum of 1, 2, 4, and 8. The point cloud encoder may perform coding according to the neighbor node pattern value (for example, when the neighbor node pattern value is 63, 64 kinds of coding may be performed). According to embodiments, the point cloud encoder may reduce coding complexity by changing a neighbor node pattern value (for example, based on a table by which 64 is changed to 10 or 6).

Figure 8:
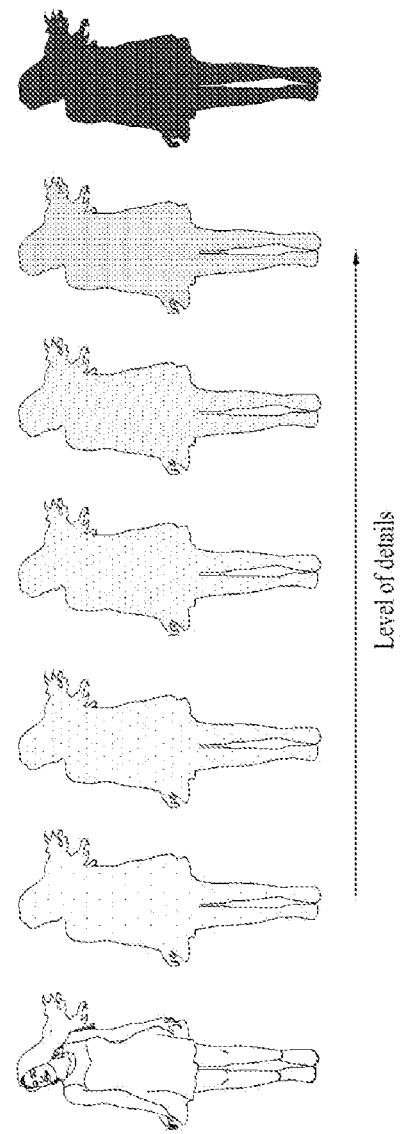
FIG. 8 illustrates an example of point configuration in each LOD according to embodiments.

FIG. 8 illustrates an example of point configuration in each LOD according to embodiments.

As described with reference to FIGS. 1 to 7, encoded geometry is reconstructed (decompressed) before attribute encoding is performed. When direct coding is applied, the geometry reconstruction operation may include changing the placement of direct coded points (e.g., placing the direct coded points in front of the point cloud data). When trisoup geometry encoding is applied, the geometry reconstruction process is performed through triangle reconstruction, upsampling, and voxelization. Since the attribute depends on the geometry, attribute encoding is performed based on the reconstructed geometry.

The point cloud encoder (for example, the LOD generator 40009) may classify (reorganize) points by LOD. The figure shows the point cloud content corresponding to LODs. The leftmost picture in the figure represents original point cloud content. The second picture from the left of the figure represents distribution of the points in the lowest LOD, and the rightmost picture in the figure represents distribution of the points in the highest LOD. That is, the points in the lowest LOD are sparsely distributed, and the points in the highest LOD are densely distributed. That is, as the LOD rises in the direction pointed by the arrow indicated at the bottom of the figure, the space (or distance) between points is narrowed.

Figure 9:
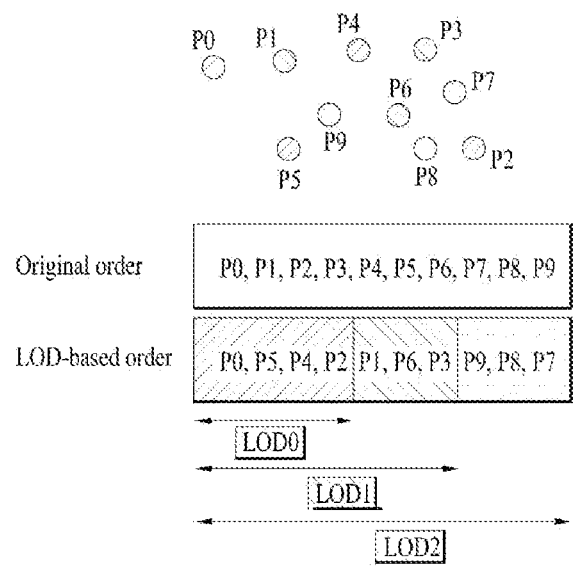
FIG. 9 illustrates an example of point configuration in each LOD according to embodiments.

FIG. 9 illustrates an example of point configuration for each LOD according to embodiments.

As described with reference to FIGS. 1 to 8, the point cloud content providing system, or the point cloud encoder (for example, the point cloud video encoder 10002, the point cloud encoder of FIG. 4, or the LOD generator 40009) may generate an LOD. The LOD is generated by reorganizing the points into a set of refinement levels according to a set LOD distance value (or a set of Euclidean distances). The LOD generation process is performed not only by the point cloud encoder, but also by the point cloud decoder.

The upper part of FIG. 9 shows examples (P0 to P9) of points of the point cloud content distributed in a 3D space. In FIG. 9, the original order represents the order of points P0 to P9 before LOD generation. In FIG. 9, the LOD based order represents the order of points according to the LOD generation. Points are reorganized by LOD. Also, a high LOD contains the points belonging to lower LODs. As shown in FIG. 9, LOD0 contains P0, P5, P4 and P2. LOD1 contains the points of LOD0, P1, P6 and P3. LOD2 contains the points of LOD0, the points of LOD1, P9, P8 and P7.

As described with reference to FIG. 4, the point cloud encoder according to the embodiments may perform prediction transform coding, lifting transform coding, and RAHT transform coding selectively or in combination.

The point cloud encoder according to the embodiments may generate a predictor for points to perform prediction transform coding for setting a predicted attribute (or predicted attribute value) of each point. That is, N predictors may be generated for N points. The predictor according to the embodiments may calculate a weight (=1/distance) based on the LOD value of each point, indexing information about neighboring points present within a set distance for each LOD, and a distance to the neighboring points.

The predicted attribute (or attribute value) according to the embodiments is set to the average of values obtained by multiplying the attributes (or attribute values) (e.g., color, reflectance, etc.) of neighbor points set in the predictor of each point by a weight (or weight value) calculated based on the distance to each neighbor point. The point cloud encoder according to the embodiments (for example, the coefficient quantizer 40011) may quantize and inversely quantize the residuals (which may be called residual attributes, residual attribute values, or attribute prediction residuals) obtained by subtracting a predicted attribute (attribute value) from the attribute (attribute value) of each point. The quantization process is configured as shown in the following table.

Attribute prediction residuals quantization pseudo code

TABLE 2

```
int PCCQuantization(int value, int quantStep) {
  if( value >=0) {
    return floor(value / quantStep + 1.0 / 3.0);
  } else {
    return -floor(-value / quantStep + 1.0 / 3.0);
  }
}
```

Attribute prediction residuals inverse quantization pseudo code

TABLE 3

```
int PCCInverseQuantization(int value, int quantStep) {
  if( quantStep ==0) {
    return value;
  } else {
    return value * quantStep;
  }
}
```

When the predictor of each point has neighbor points, the point cloud encoder (e.g., the arithmetic encoder 40012) according to the embodiments may perform entropy coding on the quantized and inversely quantized residual values as described above. When the predictor of each point has no neighbor point, the point cloud encoder according to the embodiments (for example, the arithmetic encoder 40012) may perform entropy coding on the attributes of the corresponding point without performing the above-described operation. The point cloud encoder according to the embodiments (for example, the lifting transformer 40010) may generate a predictor of each point, set the calculated LOD and register neighbor points in the predictor, and set weights according to the distances to neighbor points to perform lifting transform coding. The lifting transform coding according to the embodiments is similar to the above-described prediction transform coding, but differs therefrom in that weights are cumulatively applied to attribute values. The process of cumulatively applying weights to the attribute values according to embodiments is configured as follows.

1) Create an array Quantization Weight (QW) for storing the weight value of each point. The initial value of all elements of QW is 1.0. Multiply the QW values of the predictor indexes of the neighbor nodes registered in the predictor by the weight of the predictor of the current point, and add the values obtained by the multiplication.

2) Lift prediction process: Subtract the value obtained by multiplying the attribute value of the point by the weight from the existing attribute value to calculate a predicted attribute value.

3) Create temporary arrays called updateweight and update and initialize the temporary arrays to zero.

4) Cumulatively add the weights calculated by multiplying the weights calculated for all predictors by a weight stored in the QW corresponding to a predictor index to the updateweight array as indexes of neighbor nodes. Cumulatively add, to the update array, a value obtained by multiplying the attribute value of the index of a neighbor node by the calculated weight.

5) Lift update process: Divide the attribute values of the update array for all predictors by the weight value of the updateweight array of the predictor index, and add the existing attribute value to the values obtained by the division.

6) Calculate predicted attributes by multiplying the attribute values updated through the lift update process by the weight updated through the lift prediction process (stored in the QW) for all predictors. The point cloud encoder (e.g., coefficient quantizer 40011) according to the embodiments quantizes the predicted attribute values. In addition, the point cloud encoder (e.g., the arithmetic encoder 40012) performs entropy coding on the quantized attribute values.

The point cloud encoder (for example, the RAHT transformer 40008) according to the embodiments may perform RAHT transform coding in which attributes of nodes of a higher level are predicted using the attributes associated with nodes of a lower level in the octree. RAHT transform coding is an example of attribute intra coding through an octree backward scan. The point cloud encoder according to the embodiments scans the entire region from the voxel and repeats the merging process of merging the voxels into a larger block at each step until the root node is reached. The merging process according to the embodiments is performed only on the occupied nodes. The merging process is not performed on the empty node. The merging process is performed on an upper node immediately above the empty node.

The equation below represents a RAHT transformation matrix. In the equation, $g_{l_{x,y,z}}$ denotes the average attribute value of voxels at level l. $g_{l_{x,y,z}}$ may be calculated based on $g_{l+1_{2x,y,z}}$ and $g_{l+1_{2x+1,y,z}}$. The weights for $g_{l_{2x,y,z}}$ and $g_{l_{2x-1,y,z}}$ are $w1=w_{l_{2x,y,z}}$ and $w2=w_{l_{2x+1,y,z}}$.

$$\begin{bmatrix} g_{l-1_{x,y,z}} \\ h_{l-1_{x,y,z}} \end{bmatrix} = T_{w1w2} \begin{bmatrix} g_{l_{2x,y,z}} \\ g_{l_{2x+1,y,z}} \end{bmatrix}, \quad T_{w1w2} = \frac{1}{\sqrt{w1+w2}} \begin{bmatrix} \sqrt{w1} & \sqrt{w2} \\ -\sqrt{w2} & \sqrt{w1} \end{bmatrix}$$

Here, $g_{l-1_{x,y,z}}$ is a low-pass value and is used in the merging process at the next higher level. $h_{l-1_{x,y,z}}$ denotes high-pass coefficients. The high-pass coefficients at each step are quantized and subjected to entropy coding (for example, encoding by the arithmetic encoder 400012). The weights are calculated as $w_{l-1_{x,y,z}} = w_{l_{2x,y,z}} + w_{l_{2x+1,y,z}}$. The root node is created through the $g_{1_{0,0,0}}$ and $g_{1_{0,0,1}}$ as follows.

$$\begin{bmatrix} gDC \\ h_{0_{0,0,0}} \end{bmatrix} = T_{w1000w1001} \begin{bmatrix} g_{1_{0,0,0z}} \\ g_{1_{0,0,1}} \end{bmatrix}$$

The value of gDC is also quantized and subjected to entropy coding like the high-pass coefficients.

Figure 10:
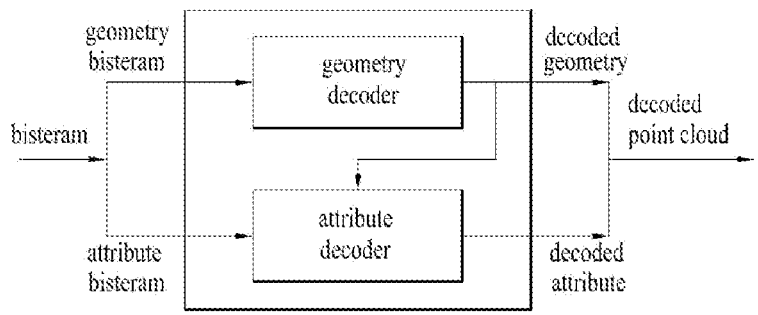
FIG. 10 illustrates a point cloud decoder according to embodiments.

FIG. 10 illustrates a point cloud decoder according to embodiments.

The point cloud decoder illustrated in FIG. 10 is an example of the point cloud video decoder 10006 described in FIG. 1, and may perform the same or similar operations as the operations of the point cloud video decoder 10006 illustrated in FIG. 1. As shown in the figure, the point cloud decoder may receive a geometry bitstream and an attribute bitstream contained in one or more bitstreams. The point cloud decoder includes a geometry decoder and an attribute decoder. The geometry decoder performs geometry decoding on the geometry bitstream and outputs decoded geometry. The attribute decoder performs attribute decoding based on the decoded geometry and the attribute bitstream, and outputs decoded attributes. The decoded geometry and decoded attributes are used to reconstruct point cloud content (a decoded point cloud).

Figure 11:
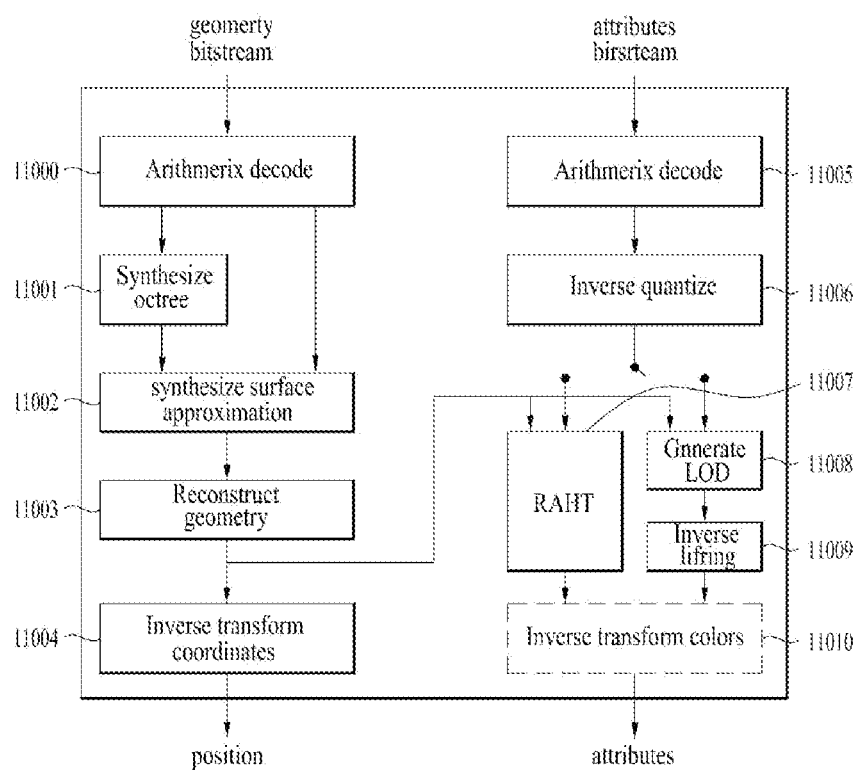
FIG. 11 illustrates a point cloud decoder according to embodiments.

FIG. 11 illustrates a point cloud decoder according to embodiments.

The point cloud decoder illustrated in FIG. 11 is an example of the point cloud decoder illustrated in FIG. 10, and may perform a decoding operation, which is a reverse process of the encoding operation of the point cloud encoder illustrated in FIGS. 1 to 9.

As described with reference to FIGS. 1 and 10, the point cloud decoder may perform geometry decoding and attribute decoding. The geometry decoding is performed before the attribute decoding.

The point cloud decoder according to the embodiments includes an arithmetic decoder (Arithmetic decode) 11000, an octree synthesizer (Synthesize octree) 11001, a surface approximation synthesizer (Synthesize surface approximation) 11002, and a geometry reconstructor (Reconstruct geometry) 11003, a coordinate inverse transformer (Inverse transform coordinates) 11004, an arithmetic decoder (Arithmetic decode) 11005, an inverse quantizer (Inverse quantize) 11006, a RAHT transformer 11007, an LOD generator (Generate LOD) 11008, an inverse lifter (inverse lifting) 11009, and/or a color inverse transformer (Inverse transform colors) 11010.

The arithmetic decoder 11000, the octree synthesizer 11001, the surface approximation synthesizer 11002, and the geometry reconstructor 11003, and the coordinate inverse transformer 11004 may perform geometry decoding. The geometry decoding according to the embodiments may include direct coding and trisoup geometry decoding. The direct coding and trisoup geometry decoding are selectively applied. The geometry decoding is not limited to the above-described example, and is performed as a reverse process of the geometry encoding described with reference to FIGS. 1 to 9.

The arithmetic decoder 11000 according to the embodiments decodes the received geometry bitstream based on the arithmetic coding. The operation of the arithmetic decoder 11000 corresponds to the inverse process of the arithmetic encoder 40004.

The octree synthesizer 11001 according to the embodiments may generate an octree by acquiring an occupancy code from the decoded geometry bitstream (or information on the geometry secured as a result of decoding). The occupancy code is configured as described in detail with reference to FIGS. 1 to 9.

When the trisoup geometry encoding is applied, the surface approximation synthesizer 11002 according to the embodiments may synthesize a surface based on the decoded geometry and/or the generated octree.

The geometry reconstructor 11003 according to the embodiments may regenerate geometry based on the surface and/or the decoded geometry. As described with reference to FIGS. 1 to 9, direct coding and trisoup geometry encoding are selectively applied. Accordingly, the geometry reconstructor 11003 directly imports and adds position information about the points to which direct coding is applied. When the trisoup geometry encoding is applied, the geometry reconstructor 11003 may reconstruct the geometry by performing the reconstruction operations of the geometry reconstructor 40005, for example, triangle reconstruction, up-sampling, and voxelization. Details are the same as those described with reference to FIG. 6, and thus description thereof is omitted. The reconstructed geometry may include a point cloud picture or frame that does not contain attributes.

The coordinate inverse transformer 11004 according to the embodiments may acquire positions of the points by transforming the coordinates based on the reconstructed geometry.

The arithmetic decoder 11005, the inverse quantizer 11006, the RAHT transformer 11007, the LOD generator 11008, the inverse lifter 11009, and/or the color inverse transformer 11010 may perform the attribute decoding described with reference to FIG. 10. The attribute decoding according to the embodiments includes region adaptive hierarchical transform (RAHT) decoding, interpolation-based hierarchical nearest-neighbor prediction (prediction transform) decoding, and interpolation-based hierarchical nearest-neighbor prediction with an update/lifting step (lifting transform) decoding. The three decoding schemes described above may be used selectively, or a combination of one or more decoding schemes may be used. The attribute decoding according to the embodiments is not limited to the above-described example.

The arithmetic decoder 11005 according to the embodiments decodes the attribute bitstream by arithmetic coding.

The inverse quantizer 11006 according to the embodiments inversely quantizes the information about the decoded attribute bitstream or attributes secured as a result of the decoding, and outputs the inversely quantized attributes (or attribute values). The inverse quantization may be selectively applied based on the attribute encoding of the point cloud encoder.

According to embodiments, the RAHT transformer 11007, the LOD generator 11008, and/or the inverse lifter 11009 may process the reconstructed geometry and the inversely quantized attributes. As described above, the RAHT transformer 11007, the LOD generator 11008, and for the inverse lifter 11009 may selectively perform a decoding operation corresponding to the encoding of the point cloud encoder.

The color inverse transformer 11010 according to the embodiments performs inverse transform coding to inversely transform a color value (or texture) included in the decoded attributes. The operation of the color inverse transformer 11010 may be selectively performed based on the operation of the color transformer 40006 of the point cloud encoder.

Although not shown in the figure, the elements of the point cloud decoder of FIG. 11 may be implemented by hardware including one or more processors or integrated circuits configured to communicate with one or more memories included in the point cloud providing apparatus, software, firmware, or a combination thereof. The one or more processors may perform at least one or more of the operations and/or functions of the elements of the point cloud decoder of FIG. 11 described above. Additionally, the one or more processors may operate or execute a set of software programs and/or instructions for performing the operations and/or functions of the elements of the point cloud decoder of FIG. 11.

Figure 12:
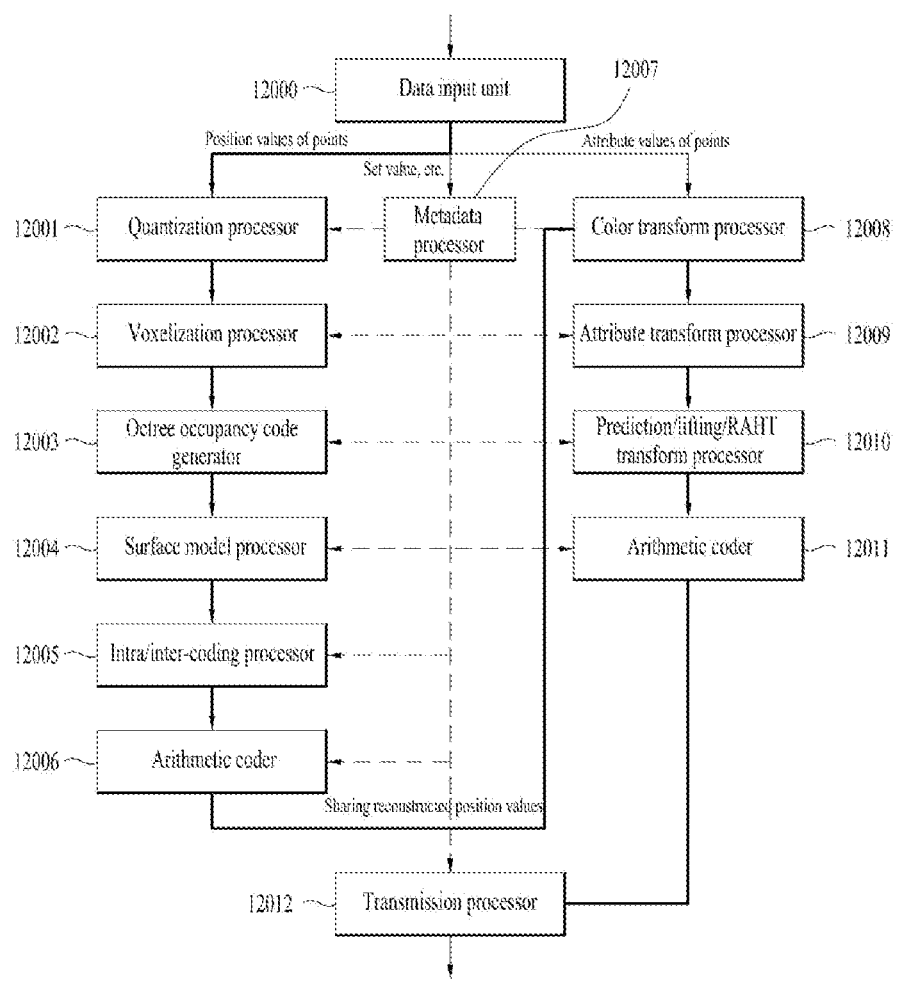
FIG. 12 illustrates a transmission device according to embodiments.

FIG. 12 illustrates a transmission device according to embodiments.

The transmission device shown in FIG. 12 is an example of the transmission device 10000 of FIG. 1 (or the point cloud encoder of FIG. 4). The transmission device illustrated in FIG. 12 may perform one or more of the operations and methods the same as or similar to those of the point cloud encoder described with reference to FIGS. 1 to 9. The transmission device according to the embodiments may include a data input unit 12000, a quantization processor 12001, a voxelization processor 12002, an octree occupancy code generator 12003, a surface model processor 12004, an intra/inter-coding processor 12005, an arithmetic coder 12006, a metadata processor 12007, a color transform processor 12008, an attribute transform processor 12009, a prediction/lifting/RAHT transform processor 12010, an arithmetic coder 12011 and/or a transmission processor 12012.

The data input unit 12000 according to the embodiments receives or acquires point cloud data. The data input unit 12000 may perform an operation and/or acquisition method the same as or similar to the operation and/or acquisition method of the point cloud video acquirer 10001 (or the acquisition process 20000 described with reference to FIG. 2).

The data input unit 12000, the quantization processor 12001, the voxelization processor 12002, the octree occupancy code generator 12003, the surface model processor 12004, the intra/inter-coding processor 12005, and the arithmetic coder 12006 perform geometry encoding. The geometry encoding according to the embodiments is the same as or similar to the geometry encoding described with reference to FIGS. 1 to 9, and thus a detailed description thereof is omitted.

The quantization processor 12001 according to the embodiments quantizes geometry (e.g., position values of points). The operation and/or quantization of the quantization processor 12001 is the same as or similar to the operation and/or quantization of the quantizer 40001 described with reference to FIG. 4. Details are the same as those described with reference to FIGS. 1 to 9.

The voxelization processor 12002 according to the embodiments voxelizes the quantized position values of the points. The voxelization processor 120002 may perform an operation and/or process the same or similar to the operation and/or the voxelization process of the quantizer 40001 described with reference to FIG. 4. Details are the same as those described with reference to FIGS. 1 to 9.

The octree occupancy code generator 12003 according to the embodiments performs octree coding on the voxelized positions of the points based on an octree structure. The octree occupancy code generator 12003 may generate an occupancy code. The octree occupancy code generator 12003 may perform an operation and/or method the same as or similar to the operation and/or method of the point cloud encoder (or the octree analyzer 40002) described with reference to FIGS. 4 and 6. Details are the same as those described with reference to FIGS. 1 to 9.

The surface model processor 12004 according to the embodiments may perform trigsoup geometry encoding based on a surface model to reconstruct the positions of points in a specific region (or node) on a voxel basis. The surface model processor 12004 may perform an operation and/or method the same as or similar to the operation and/or method of the point cloud encoder (for example, the surface approximation analyzer 40003) described with reference to FIG. 4. Details are the same as those described with reference to FIGS. 1 to 9.

The intra/inter-coding processor 12005 according to the embodiments may perform intra/inter-coding on point cloud data. The intra/inter-coding processor 12005 may perform coding the same as or similar to the intra/inter-coding described with reference to FIG. 7. Details are the same as those described with reference to FIG. 7. According to embodiments, the intra/inter-coding processor 12005 may be included in the arithmetic coder 12006.

The arithmetic coder 12006 according to the embodiments performs entropy encoding on an octree of the point cloud data and/or an approximated octree. For example, the encoding scheme includes arithmetic encoding. The arithmetic coder 12006 performs an operation and/or method the same as or similar to the operation and/or method of the arithmetic encoder 40004.

The metadata processor 12007 according to the embodiments processes metadata about the point cloud data, for example, a set value, and provides the same to a necessary processing process such as geometry encoding and/or attribute encoding. Also, the metadata processor 12007 according to the embodiments may generate and/or process signaling information related to the geometry encoding and/or the attribute encoding. The signaling information according to the embodiments may be encoded separately from the geometry encoding and/or the attribute encoding. The signaling information according to the embodiments may be interleaved.

The color transform processor 12008, the attribute transform processor 12009, the prediction/lifting/RAHT transform processor 12010, and the arithmetic coder 12011 perform the attribute encoding. The attribute encoding according to the embodiments is the same as or similar to the attribute encoding described with reference to FIGS. 1 to 9, and thus a detailed description thereof is omitted.

The color transform processor 12008 according to the embodiments performs color transform coding to transform color values included in attributes. The color transform processor 12008 may perform color transform coding based on the reconstructed geometry. The reconstructed geometry is the same as described with reference to FIGS. 1 to 9. Also, it performs an operation and/or method the same as or similar to the operation and/or method of the color transformer 40006 described with reference to FIG. 4 is performed. A detailed description thereof is omitted.

The attribute transform processor 12009 according to the embodiments performs attribute transformation to transform the attributes based on the reconstructed geometry and/or the positions on which geometry encoding is not performed. The attribute transform processor 12009 performs an operation and/or method the same as or similar to the operation and/or method of the attribute transformer 40007 described with reference to FIG. 4. A detailed description thereof is omitted. The prediction/lifting/RAHT transform processor 12010 according to the embodiments may code the transformed attributes by any one or a combination of RAHT coding, prediction transform coding, and lifting transform coding. The prediction/lifting/RAHT transform processor 12010 performs at least one of the operations the same as or similar to the operations of the RAHT transformer 40008, the LOD generator 40009, and the lifting transformer 40010 described with reference to FIG. 4. In addition, the prediction transform coding, the lifting transform coding, and the RAHT transform coding are the same as those described with reference to FIGS. 1 to 9, and thus a detailed description thereof is omitted.

The arithmetic coder 12011 according to the embodiments may encode the coded attributes based on the arithmetic coding. The arithmetic coder 12011 performs an operation and/or method the same as or similar to the operation and/or method of the arithmetic encoder 400012.

The transmission processor 12012 according to the embodiments may transmit each bitstream containing encoded geometry and/or encoded attributes and metadata information, or transmit one bitstream configured with the encoded geometry and/or the encoded attributes and the metadata information. When the encoded geometry and/or the encoded attributes and the metadata information according to the embodiments are configured into one bitstream, the bitstream may include one or more sub-bitstreams. The bitstream according to the embodiments may contain signaling information including a sequence parameter set (SPS) for signaling of a sequence level, a geometry parameter set (GPS) for signaling of geometry information coding, an attribute parameter set (APS) for signaling of attribute information coding, and a the parameter set (TPS) for signaling of a tile level, and slice data. The slice data may include information about one or more slices. One slice according to embodiments may include one geometry bitstream $Geom0^0$ and one or more attribute bitstreams $Attr0^0$ and $Attr1^0$.

A slice refers to a series of syntax elements representing the entirety or part of a coded point cloud frame.

The TPS according to the embodiments may include information about each file (for example, coordinate information and height/size information about a bounding box) for one or more tiles. The geometry bitstream may contain a header and a payload. The header of the geometry bitstream according to the embodiments may contain a parameter set identifier (geom_parameter_set_id), a tile identifier (geom_tile_id) and a slice identifier (geom_slice_id) included in the GPS, and information about the data contained in the payload. As described above, the metadata processor 12007 according to the embodiments may generate and/or process the signaling information and transmit the same to the transmission processor 12012. According to embodiments, the elements to perform geometry encoding and the elements to perform attribute encoding may share data/information with each other as indicated by dotted lines. The transmission processor 12012 according to the embodiments may perform an operation and/or transmission method the same as or similar to the operation and/or transmission method of the transmitter 10003. Details are the same as those described with reference to FIGS. 1 and 2, and thus a description thereof is omitted.

Figure 13:
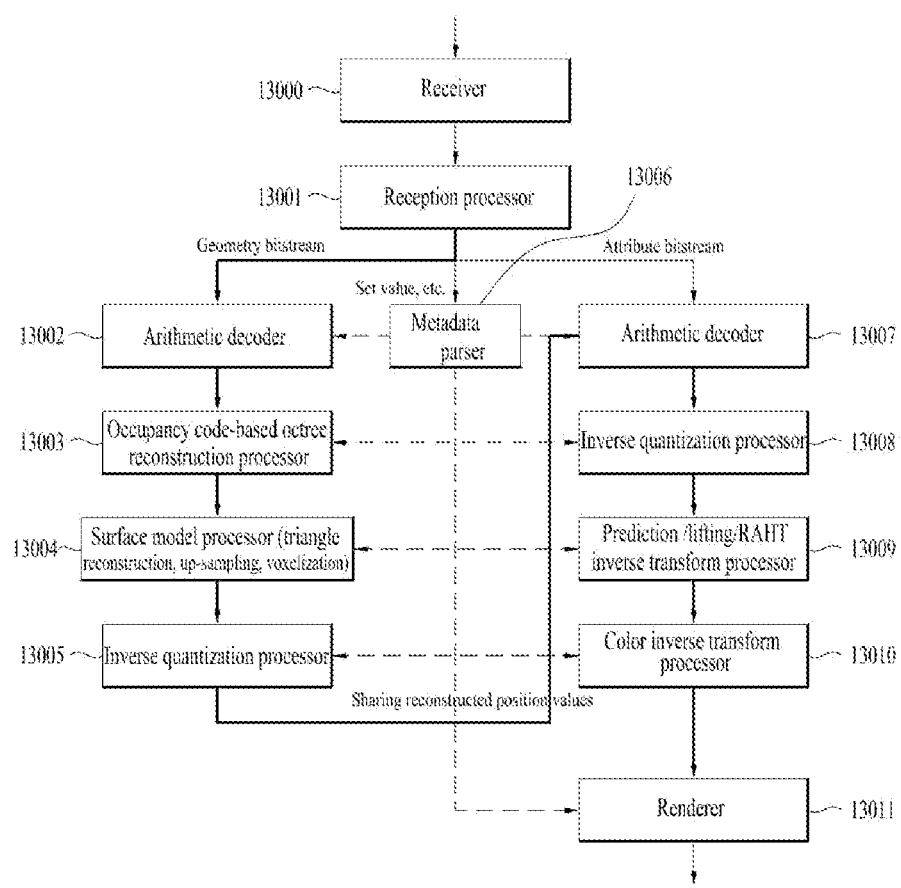
FIG. 13 illustrates a reception device according to embodiments.

FIG. 13 illustrates a reception device according to embodiments.

The reception device illustrated in FIG. 13 is an example of the reception device 10004 of FIG. 1 (or the point cloud decoder of FIGS. 10 and 11). The reception device illustrated in FIG. 13 may perform one or more of the operations and methods the same as or similar to those of the point cloud decoder described with reference to FIGS. 1 to 11.

The reception device according to the embodiment may include a receiver 13000, a reception processor 13001, an arithmetic decoder 13002, an occupancy code-based octree reconstruction processor 13003, a surface model processor (triangle reconstruction, up-sampling, voxelization) 13004, an inverse quantization processor 13005, a metadata parser 13006, an arithmetic decoder 13007, an inverse quantization processor 13008, a prediction/lifting/RAHT inverse transform processor 13009, a color inverse transform processor 13010, and/or a renderer 13011. Each element for decoding according to the embodiments may perform a reverse process of the operation of a corresponding element for encoding according to the embodiments.

The receiver 13000 according to the embodiments receives point cloud data. The receiver 13000 may perform an operation and/or reception method the same as or similar to the operation and/or reception method of the receiver 10005 of FIG. 1. A detailed description thereof is omitted.

The reception processor 13001 according to the embodiments may acquire a geometry bitstream and/or an attribute bitstream from the received data. The reception processor 13001 may be included in the receiver 13000.

The arithmetic decoder 13002, the occupancy code-based octree reconstruction processor 13003, the surface model processor 13004, and the inverse quantization processor 1305 may perform geometry decoding. The geometry decoding according to embodiments is the same as or similar to the geometry decoding described with reference to FIGS. 1 to 10, and thus a detailed description thereof is omitted.

The arithmetic decoder 13002 according to the embodiments may decode the geometry bitstream based on arithmetic coding. The arithmetic decoder 13002 performs an operation and/or coding the same as or similar to the operation and/or coding of the arithmetic decoder 11000.

The occupancy code-based octree reconstruction processor 13003 according to the embodiments may reconstruct an octree by acquiring an occupancy code from the decoded geometry bitstream (or information about the geometry secured as a result of decoding). The occupancy code-based octree reconstruction processor 13003 performs an operation and/or method the same as or similar to the operation and/or octree generation method of the octree synthesizer 11001. When the trisoup geometry encoding is applied, the surface model processor 13004 according to the embodiments may perform trisoup geometry decoding and related geometry reconstruction (for example, triangle reconstruction, up-sampling, voxelization) based on the surface model method. The surface model processor 1302 performs an operation the same as or similar to that of the surface approximation synthesizer 11002 and/or the geometry reconstructor 11003.

The inverse quantization processor 13005 according to the embodiments may inversely quantize the decoded geometry.

The metadata parser 13006 according to the embodiments may parse metadata contained in the received point cloud data, for example, a set value. The metadata parser 13006 may pass the metadata to geometry decoding and/or attribute decoding. The metadata is the same as that described with reference to FIG. 12, and thus a detailed description thereof is omitted.

The arithmetic decoder 13007, the inverse quantization processor 13008, the prediction/lifting/RAHT inverse transform processor 13009 and the color inverse transform processor 13010 perform attribute decoding. The attribute decoding is the same as or similar to the attribute decoding described with reference to FIGS. 1 to 10, and thus a detailed description thereof is omitted.

The arithmetic decoder 13007 according to the embodiments may decode the attribute bitstream by arithmetic coding. The arithmetic decoder 13007 may decode the attribute bitstream based on the reconstructed geometry. The arithmetic decoder 13007 performs an operation and/or coding the same as or similar to the operation and/or coding of the arithmetic decoder 11005.

The inverse quantization processor 13008 according to the embodiments may inversely quantize the decoded attribute bitstream. The inverse quantization processor 13008 performs an operation and/or method the same as or similar to the operation and/or inverse quantization method of the inverse quantizer 11006.

The prediction/lifting/RAHT inverse transform processor 13009 according to the embodiments may process the reconstructed geometry and the inversely quantized attributes. The prediction/lifting/RAHT inverse transform processor 13009 performs one or more of operations and/or decoding the same as or similar to the operations and/or decoding of the RAHT transformer 11007, the LOD generator 11008, and/or the inverse lifter 11009. The color inverse transform processor 13010 according to the embodiments performs inverse transform coding to inversely transform color values (or textures) included in the decoded attributes. The color inverse transform processor 13010 performs an operation and/or inverse transform coding the same as or similar to the operation and/or inverse transform coding of the color inverse transformer 11010. The renderer 13011 according to the embodiments may render the point cloud data.

Figure 14:
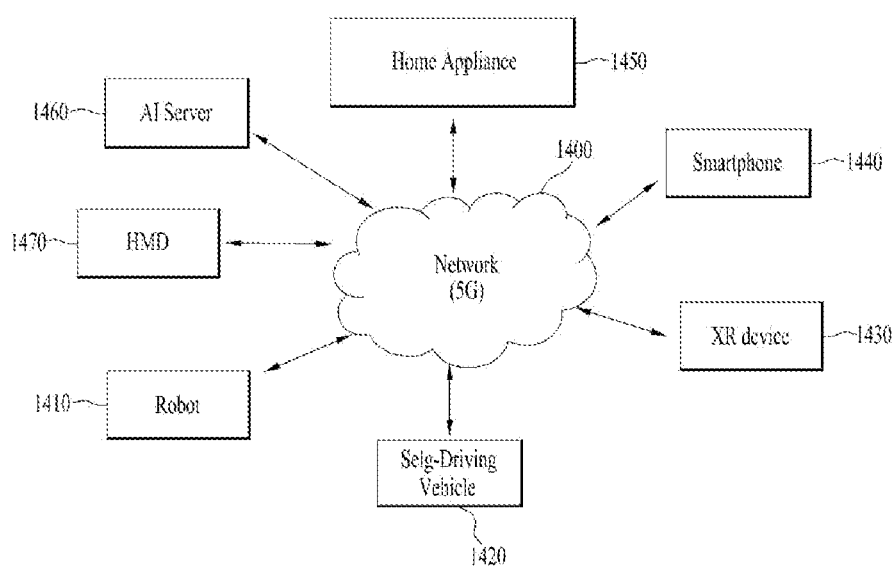
FIG. 14 illustrates an exemplary structure operable in connection with point cloud data transmission/reception methods/devices according to embodiments.

FIG. 14 illustrates an exemplary structure operable in connection with point cloud data transmission/reception methods/devices according to embodiments.

The structure of FIG. 14 represents a configuration in which at least one of a server 1460, a robot 1410, a self-driving vehicle 1420, an XR device 1430, a smartphone 1440, a home appliance 1450, and/or a head-mount display (HMD) 1470 is connected to the cloud network 1400. The robot 1410, the self-driving vehicle 1420, the XR device 1430, the smartphone 1110, or the home appliance 1450 is called a device. Further, the XR device 1430 may correspond to a point cloud data (FCC) device according to embodiments or may be operatively connected to the PCC device.

The cloud network 1400 may represent a network that constitutes part of the cloud computing infrastructure or is present in the cloud computing infrastructure. Here, the cloud network 1400 may be configured using a 3G network, 4G or Long Term Evolution (LTE) network, or a 5G network.

The server 1460 may be connected to at least one of the robot 1410, the self-driving vehicle 1420, the XR device 1430, the smartphone 1440, the home appliance 1450, and/or the HMD 1470 over the cloud network 1400 and may assist in at least a part of the processing of the connected devices 1410 to 1470.

The HMD 1470 represents one of the implementation types of the XR device and/or the PCC device according to the embodiments. The HMD type device according to the embodiments includes a communication unit, a control unit, a memory, an I/O unit, a sensor unit, and a power supply unit.

Hereinafter, various embodiments of the devices 1410 to 1450 to which the above-described technology is applied will be described. The devices 1410 to 1450 illustrated in FIG. 14 may be operatively connected/coupled to a point cloud data transmission device and reception according to the above-described embodiments.

<PCC+XR>

The XR/PCC device 1430 may employ PCC technology and/or XR (AR+VR) technology, and may be implemented as an HMD, a head-up display (HUD) provided in a vehicle, a television, a mobile phone, a smartphone, a computer, a wearable device, a home appliance, a digital signage, a vehicle, a stationary robot, or a mobile robot.

The XR/PCC device 1430 may analyze 3D point cloud data or image data acquired through various sensors or from an external device and generate position data and attribute data about 3D points. Thereby, the XR/PCC device 1430 may acquire information about the surrounding space or a real object, and render and output an XR object. For example, the XR/PCC device 1430 may match an XR object including auxiliary information about a recognized object with the recognized object and output the matched XR object.

<PCC+Self-driving+XR>

The self-driving vehicle 1420 may be implemented as a mobile robot, a vehicle, an unmanned aerial vehicle, or the like by applying the PCC technology and the XR technology.

The self-driving vehicle 1420 to which the XR/PCC technology is applied may represent a self-driving vehicle provided with means for providing an XR image, or a self-driving vehicle that is a target of control/interaction in the XR image. In particular, the self-driving vehicle 1420 which is a target of control/interaction in the XR image may be distinguished from the XR device 1430 and may be operatively connected thereto.

The self-driving vehicle 1420 having means for providing an XR/PCC image may acquire sensor information from sensors including a camera, and output the generated XR/PCC image based on the acquired sensor information. For example, the self-driving vehicle 1420 may have an HUD and output an XR/PCC image thereto, thereby providing an occupant with an XR/PCC object corresponding to a real object or an object present on the screen.

When the XR/PCC object is output to the HUD, at least a part of the XR/PCC object may be output to overlap the real object to which the occupant's eyes are directed. On the other hand, when the XR/PCC object is output on a display provided inside the self-driving vehicle, at least a part of the XR/PCC object may be output to overlap an object on the screen. For example, the self-driving vehicle 1220 may output XR/PCC objects corresponding to objects such as a road, another vehicle, a traffic light, a traffic sign, a two-wheeled vehicle, a pedestrian, and a building.

The virtual reality (VR) technology, the augmented reality (AR) technology, the mixed reality (MR) technology and/or the point cloud compression (PCC) technology according to the embodiments are applicable to various devices.

In other words, the YR technology is a display technology that provides only CG images of real-world objects, backgrounds, and the like. On the other hand, the AR technology refers to a technology that shows a virtually created CG image on the image of a real object. The MR technology is similar to the AR technology described above in that virtual objects to be shown are mixed and combined with the real world. However, the MR technology differs front the AR technology in that the AR technology makes a clear distinction between a real object and a virtual object created as a CG image and uses virtual objects as complementary objects for real objects, whereas the MR technology treats virtual objects as objects having equivalent characteristics as real objects. More specifically, an example of MR technology applications is a hologram service.

Recently, the VR, AR, and MR technologies are sometimes referred to as extended reality (XR) technology rather than being clearly distinguished from each other. Accordingly, embodiments of the present disclosure are applicable to any of the VR, AR, MR, and XR technologies. The encoding/decoding based on PCC, V-PCC, and G-PCC techniques is applicable to such technologies.

The PCC method/device according to the embodiments may be applied to a vehicle that provides a self-driving service.

A vehicle that provides the self-driving service is connected to a PCC device for wired/wireless communication.

When the point cloud data (PCC) transmission/reception device according to the embodiments is connected to a vehicle for wired/wireless communication, the device may receive/process content data related to an AR/VR/PCC service, which may be provided together with the self-driving service, and transmit the same to the vehicle. In the case where the PCC transmission/reception device is mounted on a vehicle, the PCC transmission/reception device may receive/process content data related to the AR/VR/PCC service according to a user input signal input through a user interface device and provide the same to the user. The vehicle or the user interface device according to the embodiments may receive a user input signal. The user input signal according to the embodiments may include a signal indicating the self-driving service.

Figure 15:
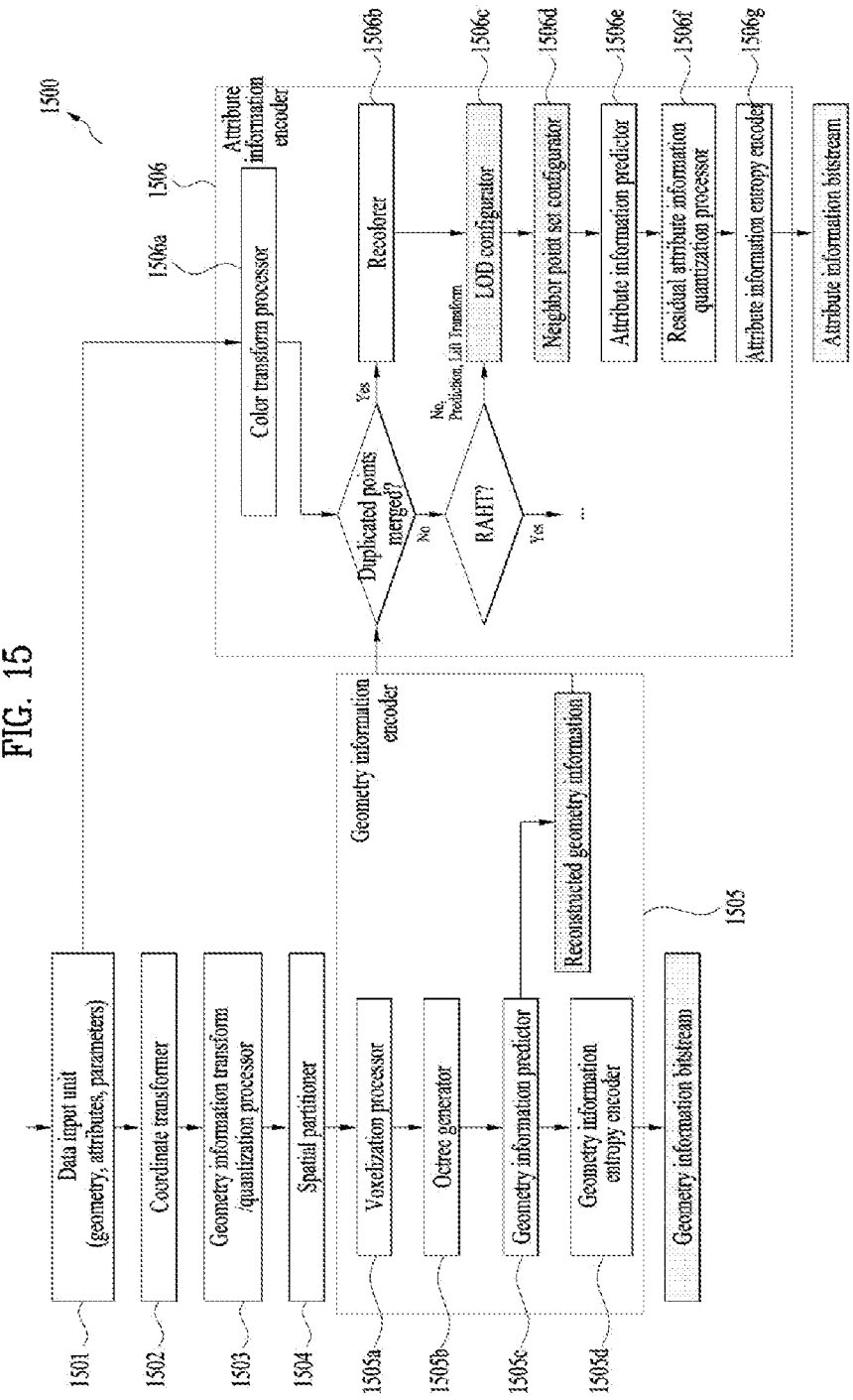
FIG. 15 is a block diagram illustrating a point cloud data transmission device according to embodiments.

FIG. 15 is a block diagram illustrating a point cloud data transmission device according to embodiments.

FIG. 15 is a block diagram illustrating a point cloud data transmission device (e.g., the point cloud data transmission device 10000 of FIG. 1, the point cloud video encoder 10002 of FIG. 1, the point cloud encoder of FIG. 4, the transmission device of FIG. 12, the encoder of FIG. 12, and the XR device 1430 of FIG. 14). The transmission device 1500 according to the embodiments may perform the same or similar operation to the encoding operation described with reference to FIGS. 1 to 14. According to embodiments, the transmission device 1500 may include a data input unit 1501, a coordinate transformer 1502, a geometry information transform quantization processor 1503, a spatial partitioner 1504, a geometry information encoder 1505, and/or an attribute information encoder 1506. Although not shown in FIG. 15, the transmission device according to the embodiments may further include one or more elements configured to perform an operation that is the same as or similar to the encoding operation described with reference to FIGS. 1 to 14.

The data input unit may receive geometry information (e.g., geometry information of FIG. 1), attribute information (e.g., attribute information of FIG. 1), and/or related parameters (e.g., parameters of FIG. 1).

The coordinate transformer 1502 may transform coordinates with respect to the position information of the geometry data. The coordinate transformer of FIG. 15 may perform the same or similar operation to the operation of the coordinate transformer 40000 of FIG. 4.

The geometry information transform quantization processor 1503 may receive a scale value (or a quantization value) and adjust the scale according to the distribution of content. The geometry information transform quantization processor of FIG. 15 may perform the same or similar operation to the operation of the quantizer 40001 of FIG. 4.

The spatial partitioner 1504 may partition the point cloud data into spatial partition units according to embodiments. For example, the spatial partitioner may spatially and adaptively partition the space of the point cloud data into tiles or blocks according to the data characteristics of the point cloud data. The spatial partitioner may perform data partitioning. A frame may be partitioned into tiles and slices. The source point cloud data may be partitioned into multiple slices and encoded in a bitstream. A slice is a set of points that may be independently encoded or decoded. The slice may include one geometry data unit and zero or one or more attribute data units. The attribute data units may be dependent on corresponding geometry data within the same slice. Within the slice, the geometry data unit may be arranged before attribute units related thereto. The data units of the slice are adjacent to each other. A group of slices may be identified by a common tile identifier. Tile information describing a bounding box for each tile may be present in the bitstream. A tile may overlap other tiles in the bounding box. Each slice may include an index for identifying that a tile belongs.

The geometry information encoder 1505 may encode the geometry of point cloud data (for example, the geometry encoding described with reference to FIGS. 1 to 14). The geometry information encoder according to embodiments may include a voxelization processor 1505a, an octree generator 1505b, a geometry information predictor 1505c, and/or a geometry information entropy encoder 1505d. The geometry information encoder may further include one or more elements configured to perform the geometry encoding described with reference to FIGS. 1 to 14.

The voxelization processor may voxelize the geometry data. The voxelization processor of FIG. 15 may perform the same or similar operation to the operation of the voxelizer 40001 of FIG. 4.

The octree generator according to embodiments may generate an octree structure of geometry data. The octree generator 1505b may generate an octree for the entire geometry or an octree for partial geometry. The octree generator of FIG. 15 may perform the same or similar operation to the operation of the octree analyzer 40002 of FIG. 4.

When the octree structure (or octree) of the geometry data is used, a geometry encoding process may be performed by the transmission device (e.g., the octree generator) as follows: a bounding box (e.g., the bounding box of FIG. 5) may be defined by two points. The octree structure is built by recursively subdividing the bounding box. One or more spaces generated by recursively subdividing the bounding box may correspond to cubes (e.g., the cubes in FIG. 6) or nodes (e.g., the nodes in FIG. 4). Each cube is divided into eight sub-cubes. Each node may correspond to one or more levels of the octree structure (e.g., the levels of the octree in FIG. 4). The one or more nodes may include a root node (e.g., the root node in FIG. 9) corresponding to the lowest level among the one or more levels, and a leaf node (e.g., a leaf node 6) corresponding to the highest level among the one or more levels. In addition, the level corresponding to each node may represent the number of hops from the root node to each node. An 8-bit code may be referred to as an occupancy code. One bit per sub-cube may be expressed as 1 when the point is occupied, and 0 when the point is empty. Sub-cubes larger than 1 are further divided. A sub-cube of a dimension equal to 1 may be a voxel. Multiple points may overlap each other and may be mapped to the same sub-cube (voxel). Points of each sub-cube may be arithmetically encoded. The decoding process may be started by reading the dimension of the bounding box from the bitstream. The same octree structure may be generated by subdividing the bounding box according to the occupancy codes. When the leaf node is reached, the points of the leaf node may be arithmetically decoded.

The geometry information predictor according to the embodiments may predict whether an octree node is occupied. A value generated by the geometry information predictor in the prediction process may be used in the geometry information reconstruction process.

The geometry information entropy encoder according to embodiments may entropy-code geometry data to generate a geometry bitstream (e.g., the geometry bitstream of FIG. 2).

The geometry information encoder according to the embodiments may perform a geometry reconstruction operation. The geometry reconstruction operation of the geometry information encoder is the same as or similar to the geometry reconfiguration operation described with reference to FIG. 8. The geometry information encoder may transmit the reconstructed geometry information generated through the geometry reconstruction operation to the attribute information encoder.

The attribute information encoder according to the embodiments may perform attribute encoding (e.g., the attribute encoding described with reference to FIGS. 1 to 14). The attribute information encoder may include a color transform processor 1506a, a recolorer 1506b, an LOD configurator 1506c, a neighbor point set configurator 1506d, an attribute information predictor 1506e, a residual attribute information quantization processor 1506f, and/or an attribute information entropy encoder 1506g. The attribute information encoder may further include a Morton code generator (not shown in FIG. 15) configured to generate Morton codes (e.g., the Morton codes of FIG. 4) for points of the point cloud data. The attribute information encoder may further include one or more elements configured to perform the attribute encoding described with reference to FIGS. 1 to 14.

The color transform processor may transform a color of attribute data input through the data input unit according to the data characteristics. The color transform processor of FIG. 15 may perform the same or similar operation to the operation of the color transformer 40006 of FIG. 4.

The recolorer may perform a recoloring process on the attribute data in response to the reconstructed geometry information based on merging of overlapping points. The reconstructed geometry information based on the merging of overlapping points may include overlapping points (or duplicated points). Duplicated points mean at least two attributes (or points). A voxel including duplicated points have at least two attributes (or points). The recolorer may perform a process of recoloring the attribute data including duplicated points according to the data characteristics.

Based on the reconstructed geometry information not being based on the merging of overlapping points, the attribute information encoder may perform RAHT coding on the attribute data. The RAHT coding operation by the attribute information encoder is the same as or similar to the operation of the RAHT transformer 40008 of FIG. 4. The attribute information encoder may perform predictive transform coding (e.g., the predictive transform coding of FIG. 4)/lifting transform (e.g., the lifting transform of FIG. 4) coding instead of the RAHT coding on the attribute data.

The LOD configurator according to the embodiments may generate an LOD from the point cloud data on which the recoloring process has been performed or the point cloud data on which predictive transform coding/lifting transform coding has been performed. The LOD configurator of FIG. 15 may perform the same or similar operation to the operation of the LOD generator 40009 of FIG. 4. That is, the LOD configurator may receive attribute information and reconstructed geometry information, and generate one or more LODs based on the received attribute information and the reconstructed geometry information. In addition, as described with reference to FIGS. 4 and 8, the LODs may be generated by reorganizing the points distributed in the three-dimensional space into a set of refinement levels. For example, the LOD configurator may generate one or more LODs by reorganizing one or more points based on the octree structure (or octree) of the geometry.

Since each node of the octree corresponds to a space into which a bounding box is divided, point cloud data (e.g., attribute data) matching each node may or may not be present. Accordingly, the LOD configurator may match the point cloud data (e.g., attribute data) to the nodes of the octree according to the reconstructed geometry information. Accordingly, by the matching process of the LOD configurator, matching between the input point cloud data and the point cloud data structured according to the octree may be performed.

An LOD is the degree of the detail of the point cloud content. Therefore, as the level indicated by the LOD (or LOD value) decreases, the detail of the point cloud content is lowered. As the level indicated by the LOD increases, the detail of the point cloud content become higher. An LOD value may correspond to the above-described octree level. For example, as the octree level rises, the LOD value of the LOD may increase. The LOD generator may generate an LOD based on a structural characteristic that the distance between nodes corresponding to the octree levels decreases as the level of the octree rises. That is, the LOD generator may generate an LOD based on a feature that points having a predetermined separation distance from each other are sampled due to the octree structure. For example, the LOD generator may classify points included in a level (e.g., level 0) corresponding to the root node of the octree into LOD 0, and points included in the level corresponding to the root node and levels corresponding to child nodes (e.g., levels 0 and 1) of the root node into LOD 1. Alternatively, the LOD generator may classify points included in a level corresponding to the root node and levels (e.g., levels 0 and 1) corresponding to child nodes of the root node into LOD 0.

The LOD generator may first generate an LOD having the greatest LOD value. That is, the LOD generator may generate an LOD in descending order of the LOD values. As described above with reference to FIGS. 8 and 9, the current LOD includes all points included in the LOD having a LOD value less than the current LOD value of the LOD. The set of LODs having an LOD value less than the current LOD value may be defined as a retained set for the current LOD. That is, when the least LOD value is 0 and the current LOD value is 1, the retained set for the current LOD may be defined as LOD 0 to LOD 1-1 from. Accordingly, LOD 1 generated by the LOD generator may be an LOD generated in the retained set defined as LOD 0 to LOD 1.

The neighbor point set configurator may generate a neighbor point set for points belonging to each LOD. A neighbor point according to the embodiments is a nearest neighbor (NN) point positioned closest to the point of each LOD set in a three-dimensional space, which is included in the same LOD as the current LOD (e.g., LOD1), or in a retained set (e.g., LOD1-1, LOD1-2, . . . , LOD0). The neighbor point set configurator may register one or more neighbor points as a neighbor point set in the predictor (e.g., the predictor of FIG. 9). The number of neighbor points according to embodiments is the maximum number of neighbor points. It may be set according to a user input signal, or may be preset to a specific value according to a neighbor point search method.

All points of the point cloud data according to the embodiments may each have one predictor. The transmission device according to the embodiments may encode an attribute value of a corresponding point using the predictor and generate a predicted attribute (or a predicted attribute value). The predictor is generated based on neighbor points searched for after the LOD generation. The predictor is used to predict attributes of a target point. Accordingly, the predictor may generate predicted attributes by applying a weight to the attributes of the neighbor points.

The attribute information predictor may predict an attribute value of a point from the neighbor point set as described above.

A residual attribute information quantization processor according to the embodiments may generate a predicted value for the attribute data, generate a residual between the predicted value and the attribute value, and quantize the residual.

An attribute information entropy encoder may generate an attribute bitstream (e.g., the attribute bitstream of FIG. 2) by entropy coding the attribute data.

The point cloud data transmission device according to the embodiments may transmit a bitstream in which a geometry bitstream and/or an attribute bitstream are multiplexed. The bitstream according to the embodiments may further include signaling information (or neighbor point set generation information) related to generating the above-described neighbor point set. The point cloud data transmission device may encapsulate the bitstream and transmit the bitstream in the form of segments and/or files.

Figure 16:
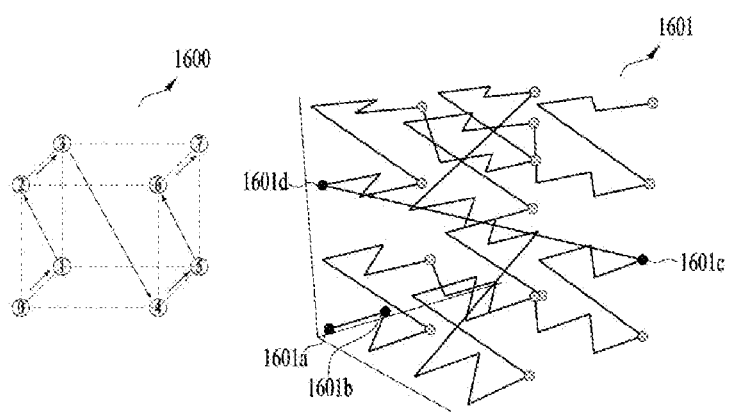
FIG. 16 illustrates an example of a Morton code and Morton code shifting according to embodiments.

FIG. 16 illustrates an example of a Morton code and Morton code shifting according to embodiments.

FIG. 16 illustrates an example of a method of searching for points by a point cloud data transmission device (e.g., the transmission apparatus 1500 of FIG. 15) using a Morton code (e.g., the Morton code of FIG. 4). The Morton code generator described in FIG. 15 may generate Morton codes according to embodiments. As described above with reference to FIG. 4, the Morton code generator may generate a Morton code of each point by indicating position values (e.g., coordinate values (x, y, z) of a coordinate system representing a three-dimensional space) as bit values and mixing the bits.

The part indicated by 1600 illustrates that the point cloud data transmission device searches for points of the point cloud data according to a three-dimensional Morton code curve. The 3D Morton code curve may refer to a curve that connects points to each other such that Morton codes of the points in a 3D space (for example, the bounding box of FIG. 5) are sorted in ascending or descending order. For example, the three-dimensional Morton code curve may connect a point (0, 0, 0) in a three-dimensional plane with a Morton code (or Morton code value) equal to 0 (a point with a x-coordinate equal to 0, a y-coordinate equal to 0, and a z-coordinate equal to 0) to a point (0, 0, 1) in the three-dimensional plane with a Morton code equal to 1. In addition, the three-dimensional Morton code curve 20002c may connect a point (0, 0, 1) in the three-dimensional plane with a Morton code equal to 1 to a point (0, 1, 0) in the three-dimensional plane with a Morton code equal to 2.

The part indicated by 1601 illustrates that the point cloud data transmission device according to the embodiments connects points in the bounding box with a 3D Morton code curve. As described above with reference to FIG. 15, the neighbor point set configurator 1506d may register a neighbor point positioned closest to a target point targeted by generation of the neighbor point set as a neighbor point set. The neighbor point set configurator may use Morton codes of points to search for neighbor points positioned closest to the target point. That is, the neighbor point set configurator may compare the Morton code values of the points with the Morton code value of the target point and register points having a Morton code value closest to the Morton code value of the target point as a neighbor point set. For example, the neighbor point set configurator may register a point 1601*b* having a Morton code value closest to the Morton code value of the target point 1601*a* as a neighbor point set of the target point 1601*a*.

However, when the neighbor point set configurator uses Morton codes of points to search for neighbor points, points other than real neighbor points may be searched for. For example, the neighbor point set configurator may register a point 1601*d* having a Morton code value closest to the Morton code value of the target point 1601*c* as a neighbor point set of the target point 1601*c*. That is, the neighbor point set configurator may search for a point other than the real neighbor points as a neighbor point due to a zigzag scan of the 3D Morton code curve.

The attribute information encoder (e.g., the attribute information encoder 1506 of FIG. 15) may perform shifting on values of Morton codes of the points of the point cloud data to overcome the above-described issues. The shifting may represent right bit-shifting. That is, the shifting may be an operation of padding three zeros to the left of a bit string to shift the bits to the right to delete three bits on the right side of the bit string. For example, when shifting is performed on a bit string of 110110, 000110 may be obtained. The Morton codes of the points may be represented as integers or binary bits. When the Morton code of an integer value is shifted, a value equal to a quotient obtained by dividing the integer by 8 may be obtained. For example, when the Morton code indicates 63, the shifted Morton code may be 7.

Morton codes of integer values may be represented as any one of 8n, 8n+1, 8n+2, 8n+3, 8n+4, 8n+5, 8n+6, and 8n+7 (where n is, for example, an integer greater than or equal to 0). According to embodiments, points with the same shifted Morton code value may be points actually positioned close to each other. For example, the Morton code value of the point 1601*a* may be represented as 8x, and the Morton code value of the point 1601*b* may be represented as 8x+1 (where x is an integer greater than or equal to 0). In addition, both the shifted Morton code value of the point 1601*a* and the shifted Morton code value of the point 1601*b* may be represented as n. According to embodiments, when the shifted Morton code values are used to search for neighbor points, points other than the real neighbor points may not be searched for even if the Morton code values of the points are close. For example, the Morton code of the point 1601*c* may be represented as 8y+4 (where y is an integer greater than or equal to 0), and the Morton code of the point 1601*d* may be represented as 8z (where z is an integer that is greater than or equal to 0 and is different from y). That is, the shifted Morton code of the point 1601*c* may be y, whereas the Morton code of the point 1601*d* may be z. Accordingly, the neighbor point set configurator may avoid searching for a point having a shifted Morton code value different from the shifted Morton code value of the target point as a neighbor point, thereby addressing the issue of searching for a point other than the real neighbor points as a neighbor point.

Figure 17:
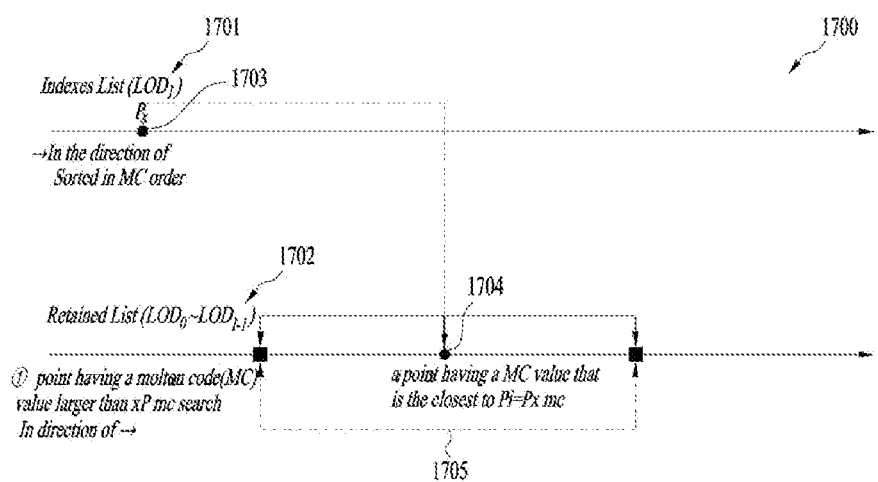
FIG. 17 illustrates an example of a method of configuring a neighbor point set according to embodiments.

FIG. 17 illustrates an example of a method of configuring a neighbor point set according to embodiments.

FIG. 17 illustrates an example of a process in which a neighbor point set configurator (e.g., the neighbor point set configurator 1506*d* of FIG. 15) generates a neighbor point set.

The arrow line indicated by 1700 in the figure represents a Morton code order (e.g., an ascending order of Morton code values of points) according to embodiments. Indexes list 1701 represents sorting according to the Morton code order of points included in LOD1 to which a target point Px 1703 that is a target of the neighbor point set generation according to the embodiments belongs. Retained list 1702 represents sorting according to a Morton code order of points included in the retained set (e.g., the retained set described with reference to FIG. 15) of LOD1 to which the target point Px belongs. That is, a point at the leading position in the indexes list and the retained list may have a Morton code of the smallest size among the points included in the LOD 1 and the points included in the retained set of the LOD 1. According to embodiments, the neighbor point set configurator may perform a neighbor point search for points positioned after Px (i.e., points whose Morton codes are greater than or equal to the Morton code of Px) in Morton code order among the points belonging to the retained set of LOD 1 and the points belonging to LOD 1 in order to generate a neighbor point set of Px belonging to LOD 1.

According to embodiments, the neighbor point set configurator may compare the Morton code values of the points included in LOD 1 to which the target point to Px belongs and/or the retained set for LOD 1 to select a point 1704 having a Morton code value closest to the Morton code value of Px. The selected point 1704 may be referred to as a reference point. That is, the neighbor point set configurator may select a reference point based on the Morton code value of the target point Px. The method of selecting the reference point is not limited to this example. According to embodiments, information on a type of selection of the reference point (or reference point selection type information) may be included in the neighbor point set generation information (e.g., the neighbor point set generation information described with reference to FIG. 15) and transmitted to the reception device (e.g., the receiver 10004 of FIG. 1, the decoder of FIGS. 10 and 11, or the like) through a bitstream containing encoded point cloud data.

The neighbor point set configurator may configure a neighbor point search range 1705 based on the selected reference point. The neighbor point search range may contain one or more points positioned before/after (or in front of/behind) the reference point in Morton code order. Information on the neighbor point search range may be included in the neighbor point set generation information (e.g., the neighbor point set generation information described with reference to FIG. 15) and transmitted to the reception device (e.g., the reception device 10004 of FIG. 1, the decoder of FIGS. 10 and 11, or the like) through a bitstream containing the encoded point cloud data. The neighbor point set configurator may compare distances from the points within the neighbor point search range determined based on the reference point to Px to search for points closest to Px as many as a set maximum number of neighbor points (e.g., 3). The neighbor point set configurator may register the points searched for as many as the set maximum number of neighbor points as neighbor points of the target point Px. The neighbor point set search method according to the embodiments is not limited to this example.

The neighbor point set configurator may generate a neighbor point set of a target point belonging to LOD 1 by the above-described neighbor point set search method. The neighbor point set configurator may differently apply the above-described neighbor point set search method for each LOD.

The neighbor point search method according to the embodiments may reduce the complexity of attribute encoding and increase compression efficiency. However, according to the above-described neighbor point search method, a point other than the real neighbor points may be searched for as a neighbor point as described with reference to FIG. 16. Neighbor point set generation information related to the above-described neighbor point search method is transmitted to the reception device through a bitstream. Accordingly, the reception device may generate a neighbor point set based on the neighbor point set generation information.

Figure 18:
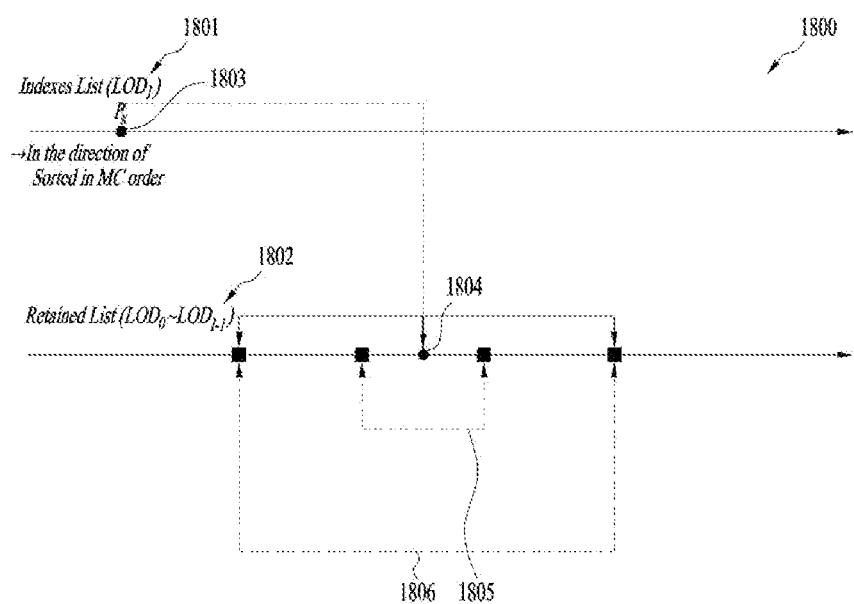
FIG. 18 illustrates an example of a method of configuring a neighbor point set according to embodiments.

FIG. 18 illustrates an example of a method of configuring a neighbor point set according to embodiments.

FIG. 18 illustrates an example of a process in which the attribute information encoder (e.g., the attribute information encoder 1506 of FIG. 15) generates a neighbor point set.

The arrow line indicated by 1800 in the figure represents a Morton code order (e.g., an ascending order of Morton code values of points) according to embodiments. Indexes list 1801 represents sorting according to the Morton code order of points included in LOD 1 to which a target point Px 1803 that is a target of the neighbor point set generation according to the embodiments belongs. Retained list 1802 represents sorting according to a Morton code order of points included in a retained set (e.g., the retained set described with reference to FIG. 15) of LOD 1 to which the target point Px belongs. That is, a point at the leading position in the indexes list and the retained list may have a Morton code of the smallest size among the points included in LOD 1 and the points included in the retained set of LOD 1. According to embodiments, the attribute information encoder may perform a neighbor point search on the points positioned after Px (i.e., the points whose Morton codes are greater than or equal to the Morton code of Px) in Morton code order among the points included in the retained set and the points included in LOD 1 in order to generate a neighbor point set of Px belonging to LOD 1.

The attribute information encoder may perform shifting (e.g., the shifting described above in FIG. 16) on the Morton code of the target point Px. The attribute information encoder may perform shifting on the Morton code of the target point Px according to the shifting value. The attribute information encoder may shift the Morton code of the target point Px by (h−l−1). Here, h denotes the total number of LOD values. For example, as described above with reference to FIG. 15, the LODs may begin with LOD 0. Thus, when the maximum LOD value is 10, h indicates 11. Also, l denotes the LOD value of an LOD to which the target point Px belongs. For example, when the total number of LOD values is 10, and the LOD value of the LOD to which Px belongs is 6, (h−l−1) may indicate 3. As described above with reference to FIG. 16, when the Morton code of the point is shifted once, the integer value of the Morton code of the point is equal to the quotient obtained by dividing the integer value of the Morton code by 8. The attribute information encoder may perform shifting on the Morton code of Px (h−l−1) times. For example, when (h−l−1) for the point is 3, the attribute information encoder may perform shifting on the Morton code of the point three times, and the shifted Morton code is equal to the quotient obtained by dividing the Morton code of the point by 8^3. Here, (h−l−1) may be referred to as a first shifting value, and performing shifting on the Morton code of the point (h−l−1) times may be referred to as first shifting. Information on the total number of LOD values (or information on the value of h) according to the embodiments may be included in neighbor point set generation information (e.g., the neighbor point set generation information described with reference to FIG. 15) and transmitted to the reception device (e.g., the receiver 10004 of FIG. 1, the decoder of FIGS. 10 and 11, or the like) through a bitstream containing encoded point cloud data.

The attribute information encoder may perform the first shifting on the Morton code of the target point Px according to the first shifting value, and perform the first shifting on the Morton codes of points included in LOD 1 and/or the retained set of LOD 1 according to a shifting value equal to the first shifting value. For example, when the first shifting value corresponding to the target point Px is 3, the attribute information encoder shifts each of the Morton codes of points included in LOD 1 and/or the retained set of LOD 1 by 3. The attribute information encoder may select points having a first shifted Morton code value equal to the Morton code value of the target point Px obtained by the first shifting in LOD 1 and/or the retained set of LOD 1. The selected points may be referred to as reference points. That is, the attribute information encoder may select the reference points based on the Morton code value of the target point Px obtained by the first shifting. The method of selecting the reference points is not limited to this example. According to embodiments, information on the type of selection of reference points (or reference point selection type information) may be included in neighbor point set generation information (e.g., the neighbor point set generation information of FIG. 15) and transmitted to the reception device (e.g., the receiver 10004 of FIG. 1, the decoder of FIGS. 10 and 11, or the like) through a bitstream containing encoded point cloud data. The reference points according to the embodiments may be referred to as a neighbor point candidate group or neighbor candidate points. The above-described reference points (or neighbor point candidate group) are used to search for a neighbor point set of a target point.

As described above with reference to FIG. 15, an octree level (or level) according to embodiments may correspond to an LOD value of the LOD. When the Morton codes of points included in a bounding box (e.g., the bounding box of FIG. 15) are shifted h times, all the shifted Morton codes of the points may have the same value (e.g., 0), and all points may be included in one node (e.g., the root node of FIG. 15). The above-described node may be a node corresponding to octree level 0, and octree level 0 may correspond to LOD 0. In addition, when the Morton codes of the points included in the bounding box are shifted (h−1) times, the number of values of the shifted Morton codes of the points may be 8^1, and all points may be divided and included in 8^1 nodes. The 8^1 nodes may be nodes corresponding to octree level 1, and octree level 1 may correspond to LOD 1. That is, when the shifting is performed one less time, the number of nodes included in each of the points is reduced by ⅛. Accordingly, when the shifting is performed on the points (h−l−1) times, the points may be divided and included in 8^(l−1) nodes, and the shifted Morton code values of the points included in a space corresponding to each nodes may be the same. That is, when the Morton codes of the points are shifted (h−l−1) times, the shifted Morton codes of the points included in the space corresponding to the node of a level lowered by 1 from the level of the node to which the target point Px belongs are all the same. The node of the level lowered by 1 from the level of the node to which the target point Px belongs may be referred to as a parent node of Px. Accordingly, the reference points having the same first shifted Morton code value as the first shifted Morton code value of Px selected in LOD 1 and/or the retained set of LOD 1 may be points included in a space corresponding to the parent node of the node to which Px belongs. The space corresponding to the parent node may include both the target point Px and the selected reference points.

As described above, the attribute information encoder according to the embodiments may select points included in the space corresponding to the parent node of a node to which Px belongs as reference points. The attribute information encoder may configure a reference range 1805 based on the one or more reference points described above. The reference range may include a reference point having the least Morton code and a reference point having the greatest Morton code among the reference points at both ends thereof. The attribute information encoder may configure a center point 1804 of the configured reference range. The center point may be a reference point having a Morton code corresponding to the center value among the Morton codes of the reference points included in the reference range. The method of configuring the reference range and the center point is not limited to this example.

The attribute information encoder may configure a neighbor point search range 1806 (for example, the neighbor point search range described with reference to FIG. 17) based on the configured center point 1804. The neighbor point search range may contain one or more points positioned before/after (or in font of/behind) the reference point in order of the Morton codes. Information on the neighbor point search range may be included in the neighbor point set generation information and transmitted to the reception device (e.g., the reception device 10004 of FIG. 1, the decoder of FIGS. 10 and 11, or the like) through a bitstream containing encoded point cloud data. The attribute information encoder may compare distances from the points within the neighbor point search range determined based on a center point to Px to search for points closest to Px as many as a set maximum number of neighbor points (e.g., three). The attribute information encoder may register the points searched for as many as the set maximum number of neighbor points as neighbor points of the target point Px. The neighbor point set search method according to the embodiments is not limited to this example.

According to embodiments, the attribute information encoder may search for a neighbor point among reference points. That is, the attribute information encoder may compare the distances from the points included in the reference points to Px to search for points closest to Px as many as a set maximum number of neighbor points (e.g., 3). The points searched for as many as the set maximum number of neighbor points may be registered as neighbor points (or a neighbor point set) of Px. Accordingly, the neighbor points of Px may be included in the reference points.

The attribute information encoder may generate a neighbor point set of a target point belonging to LOD1 by the above-described neighbor point set search method. The neighbor point set configurator according to the embodiments may differently apply the above-described neighbor point set search method for each LOD.

The neighbor point search method according to the embodiments may reduce the complexity of attribute encoding and increase compression efficiency. In addition, as points included in the space corresponding to the parent node of the target point are searched for, the issue of searching for a point other than the real neighbor points as a neighbor point may be addressed. Neighbor point set generation information related to the above-described neighbor point search method is transmitted to the reception device through a bitstream. Accordingly, the reception device may generate a neighbor point set based on the neighbor point set generation information.

Figure 19:
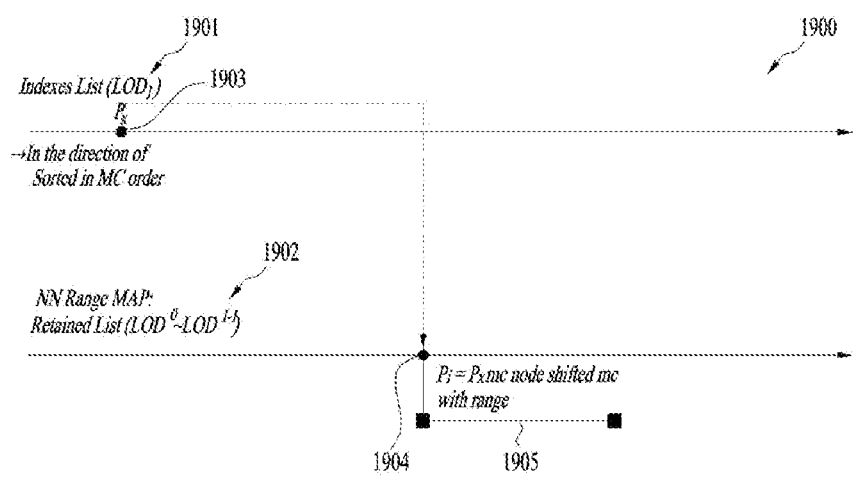
FIG. 19 illustrates an example of a method of configuring a neighbor point set according to embodiments.

FIG. 19 illustrates an example of a method of configuring a neighbor point set according to embodiments.

FIG. 19 illustrates an example of a process in which the attribute information encoder (e.g., the attribute information encoder 1506 of FIG. 15) generates a neighbor point set.

When points of the point cloud data according to the embodiments are sparsely distributed, the attribute information encoder may fail to search for sufficient neighbor points despite the neighbor point search method of FIG. 18 described above. That is, when the points of the point cloud data are sparsely distributed, the points may not be sufficiently distributed in the space corresponding to the parent node of a node to which the target point for generation of a neighbor point set belongs. Accordingly, the attribute information encoder may search for neighbor points by adjusting the shifting value based on the characteristics of the point cloud data. For example, the attribute information encoder may search for neighbor points based on points included in a space corresponding to a node (for example, a grand parent node of the parent node) whose level is lower than the parent node of a node to which the target point belongs.

The arrow line indicated by 1900 in the figure represents a Morton code order (e.g., an ascending order of Morton code values of points) according to embodiments. Indexes list 1901 represents sorting according to the Morton code order of points included in LOD 1 to which a target point Px 1903 for generation of a neighbor point set belongs. Retained list 1902 represents sorting according to a Morton code order of points included in a retained set (e.g., the retained set described with reference to FIG. 15) of LOD 1 to which the target point Px belongs. That is, a point at the leading position in the indexes list and the retained list may have a Morton code of the smallest size among the points included in the LOD 1 and the points included in the retained set of the LOD 1. According to embodiments, the attribute information encoder may perform a neighbor point search on points positioned after Px (i.e., points whose Morton codes are greater than or equal to the Morton code of Px) in Morton code order among the points included in the retained set and the points included in the LOD 1 in order to generate a neighbor point set of Px belonging to LOD 1.

The attribute information encoder may perform shifting (e.g., the shifting described above with reference to FIG. 16) on the Morton code of the target point Px. The attribute information encoder may perform shifting on the Morton code of the target point Px according to the shifting value. The attribute information encoder may shift the Morton code of the target point Px by (h−l−1−range). Here, h denotes the total number of LOD values. For example, as described above with reference to FIG. 15, the LODs may begin with LOD 0. Thus, when the maximum LOD value is 10, h indicates 11. Also, l denotes the LOD value of an LOD to which the target point Px belongs. The variable "range" has an integer value greater than or equal to 1. The range may be a value related to the level of a node corresponding to a space in which the reference points are selected (for example, the level of the upper node of a node to which the target point belongs). As described above with reference to FIG. 16, when the Morton code of a point is shifted once, the integer value of the Morton code of the point is equal to the quotient obtained by dividing the integer value of the Morton code by 8. The attribute information encoder may perform shifting on the Morton code of Px (h−l−1−range) times. For example, when (h−l−1−range) for the point is 2, the attribute information encoder performs shifting on the Morton code of the point twice, and the shifted Morton code is equal to the quotient obtained by dividing the Morton code value of the point by 8^2. Here, (h−l−1−range) may be referred to as a second shifting value, and performing shifting on the Morton code of a point (h−l−1−range) times may be referred to as second shifting. Information on the total number of LOD values (or information on the value of h) and information on the value of range may be included in the neighbor point set generation information (for example, the neighbor point set generation information described above with reference to FIG. 15) and transmitted to the reception device (e.g., the decoder of FIG. 1, the decoder of FIGS. 10 and 11, etc.) through a bitstream containing encoded point cloud data. The reference points according to the embodiments may be referred to as a neighbor point candidate group or neighbor candidate points. The above-described reference points (or neighbor point candidate group) are used to search for a neighbor point set of the target point.

The attribute information encoder according to embodiments may perform the second shifting on the Morton code of the target point Px according to the second shifting value, and may perform the second shifting on the Morton codes of points included in LOD 1 and/or the retained set of LOD 1 according to a shifting value equal to the second shifting value. For example, when the second shifting value corresponding to the target point Px is 2, the attribute information encoder shifts each of the Morton codes of points included in LOD 1 and/or the retained set of LOD 1 by 2. The attribute information encoder may select points having a second shifted Morton code value equal to the Morton code value of the target point Px obtained by the second shifting in LOD 1 and/or the retained set of LOD 1. The selected points may be referred to as reference points. That is, the attribute information encoder may select the reference points based on the Morton code value of the target point Px obtained by the second shifting. The method of selecting the reference points is not limited to this example. According to embodiments, information on the type of selection of reference points (or reference point selection type information) may be included in neighbor point set generation information (e.g., the neighbor point set generation information described with reference to FIG. 15) and transmitted to the reception device (e.g., the receiver 10004 of FIG. 1, the decoder of FIGS. 10 and 11, or the like) through a bitstream containing encoded point cloud data.

As described above with reference to FIG. 15, an octree level (or level) according to embodiments may correspond to an LOD value of the LOD. When the Morton codes of points included in the bounding box (e.g., the bounding box of FIG. 15) are shifted h times, all the shifted Morton codes of the points may have the same value (e.g., 0), and all points may be included in one node (e.g., the root node of FIG. 15). The above-described node may be a node corresponding to octree level 0, and octree level 0 may correspond to LOD 0. In addition, when the Morton codes of the points included in the bounding box are shifted (h−1) times, the number of values of the shifted Morton codes of the points may be 8^1, and all points may be divided and included in 8^1 nodes. The 8^1 nodes may be nodes corresponding to octree level 1, and octree level 1 may correspond to LOD1. That is, as the shifting according to the embodiments is performed one less time, the number of nodes included in each of the points is reduced by ⅛. Accordingly, when the shifting is performed on the points by (h−l−1−range), the points may be divided and included in 8^(l−1−range) nodes, and the shifted Morton code values of the points included in the space corresponding to each node may be the same. That is, when the Morton codes of the points are shifted by (h−l−1−range), the shifted Morton codes of the points included in the space corresponding to the node of a level lower than the level of the node to which the target point Px belongs by 1+range level are all the same. A node of a level lower than the level of the node to which the target point Px belongs by 1+range level may be referred to as an upper node of Px. Accordingly, the reference points having the same second shifted Morton code value as the second shifted Morton code value of Px selected in LOD1 and/or the retained set of LOD1 may be points included in a space corresponding to the upper node of the node to which Px belongs. The space corresponding to the upper node may include both the target point Px and the selected reference points.

As described above, the attribute information encoder according to the embodiments may select points included in the space corresponding to the parent node of a node to which Px belongs as reference points. The attribute information encoder may configure a reference range 1905 based on one or more reference points described above. The reference range may include a reference point having the least Morton code among the reference points and a reference point having the greatest Morton code at both ends thereof. The attribute information encoder may configure a center point 1804 of the configured reference range. The center point may be a reference point having the least Morton code corresponding among the Morton codes of the reference points included in the reference range. The method of configuring the reference range and the center point is not limited to this example.

The attribute information encoder may compare the distances from the points within the reference range to Px based on the set center point 1904 and search for the points closest to Px as many as the set maximum number of neighbor points (e.g., 3). The attribute information encoder may register the points searched for as many as the set maximum number of neighbor points as neighbor points of the target point Px. The neighbor point set search method according to the embodiments is not limited to this example.

The attribute information encoder may search for a neighbor point among reference points. That is, the attribute information encoder may compare the distances from the points included in the reference points to Px to search for points closest to Px as many as a set maximum number of neighbor points (e.g., 3). The points searched for as many as the set maximum number of neighbor points may be registered as neighbor points (or a neighbor point set) of Px. Accordingly, the neighbor points of Px may be included in the reference points.

The attribute information encoder may generate a neighbor point set of a target point belonging to LOD1 by the above-described neighbor point set search method. The neighbor point set configurator according to the embodiments may differently apply the above-described neighbor point set search method for each LOD.

The neighbor point search method according to the embodiments may reduce the complexity of attribute encoding and increase compression efficiency. In addition, as points included in the space corresponding to the parent node of the target point are searched for, the issue of searching for a point other than the real neighbor points as a neighbor point may be addressed. Neighbor point set generation information related to the above-described neighbor point search method is transmitted to the reception device through a bitstream. Accordingly, the reception device may generate a neighbor point set based on the neighbor point set generation information.

Figure 20:
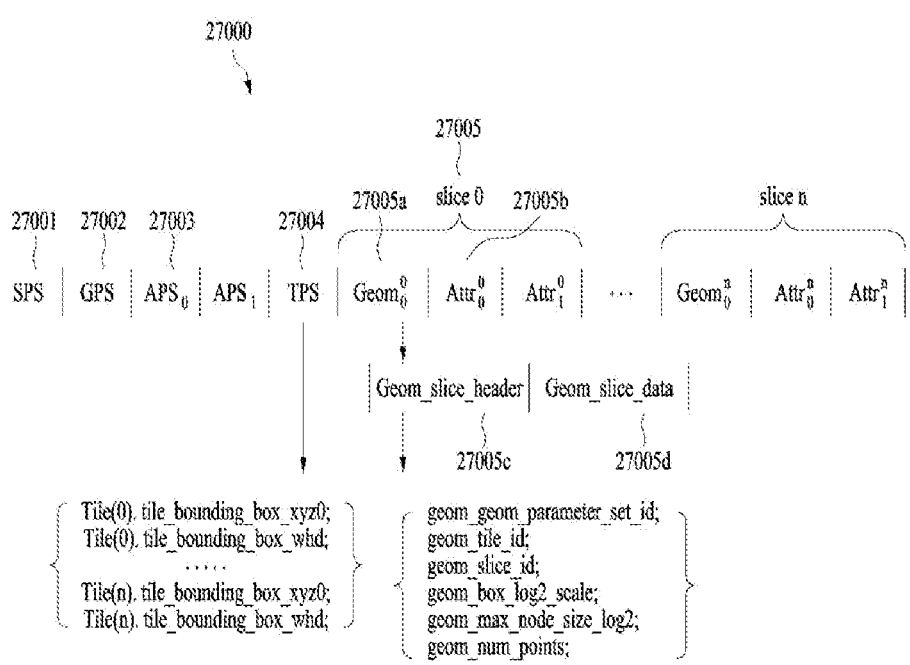
FIG. 20 shows a structure of a bitstream according to embodiments.

FIG. 20 shows a structure of a bitstream according to embodiments.

As described above, the point cloud data transmission device (e.g., the point cloud data transmission device described with reference to FIGS. 1, 11, 14 and 15) may transmit the encoded point cloud data in the form of a bitstream 27000. The bitstream 27000 may include one or more sub-bitstreams.

The point cloud data reception device (e.g., the point cloud data reception device described with reference to FIGS. 1, 2, 13 and 24) receives a bitstream from the point cloud data transmission device. The point cloud data reception device may parse and decode the received bitstream.

The point cloud data transmission device (e.g., the point cloud data transmission device described with reference to FIGS. 1, 11, 14 and 15) may divide the image of the point cloud data into one or more packets in consideration of the error of the transmission channel and transmit the packets over a network. The bitstream 27000 may contain one or more packets (e.g., network abstraction layer (NAL) units). Therefore, even when some packets are lost in a poor network environment, the point cloud data reception device may reconstruct the image using the remaining packets. The point cloud data may be partitioned into one or more slices or one or more tiles to be processed. The tiles and slices according to embodiments are regions for performing point cloud compression coding by partitioning a picture of the point cloud data. The point cloud data transmission device may provide high-quality point cloud content by processing data corresponding to each region according to the importance of each partitioned region of the point cloud data. That is, the point cloud data transmission device may perform point cloud compression coding with better compression efficiency and appropriate latency on data corresponding to a region important to a user.

A tile according to the embodiments represents a cuboid in a three-dimensional space (e.g., a bounding box) in which point cloud data is distributed. A slice according to the embodiments is a series of syntax elements representing some or all of encoded point cloud data, and represents a set of points that may be independently encoded or decoded. According to embodiments, a slice may include data transmitted through a packet, and may include one geometry data unit and zero or more attribute data units. According to embodiments, a tile may include one or more slices.

The point cloud data transmission device according to the embodiments may transmit a bitstream 27000 having a bitstream structure as shown in this figure. The bitstream 27000 of the point cloud data may include a sequential parameter set (SPS) 27001, a geometry parameter set (GPS) 27002, an attribute parameter set (APS) 27003, a tile parameter set (TPS) 27004, and one or more may include slices 27005. The bitstream 27000 of the point cloud data may include one or more tiles. A tile according to the embodiments may be a group of slices including one or more slices.

The Sequence Parameter Set (SPS) 27001 is a syntax structure containing syntax elements that apply to zero or more entire CVSs as determined by the content of a syntax element found in the PPS referred to by a syntax element found in each slice segment header. The SPS may include sequence information about the point cloud data bitstream according to the embodiments.

The Geometry Parameter Set (GPS) 27002 may represent a syntax structure including syntax elements that apply to zero or more entire geometry (or encoded geometry). The GPS 27002 may include information about a method of encoding attribute information of the point cloud data included in the one or more slices 27005. The GPS 27002 may include SPS identifier information indicating the SPS 27001 to which the included geometry parameter is related, and GPS identifier information for identifying the GPS.

The APS 27003 may represent a syntax structure including syntax elements that apply to zero or more entire attributes (or encoded attributes). The APS 27003 may include information about a method of encoding attribute information of the point cloud data included in the one or more slices 27005. The APS 27003 may include SPS identifier information indicating the SPS 27001 to which the included geometry parameter is related, and APS identifier information for identifying the APS.

The Tile Parameter Set (TPS) 27004 may represent a syntax structure including syntax elements that apply to zero or more entire tiles (or encoded tiles). A tile inventory includes information about zero or more tiles included in the point cloud data bitstream. According to embodiments, the tile inventory may be referred to as a tile parameter set (TPS).

The TPS 27004 may include identifier information for identifying one or more tiles and information indicating a range of the one or more tiles (i.e., a bounding box of the tile). The information indicating the range of the one or more tiles (i.e., the bounding box of the tile) may include coordinate information about a point that is a reference of a bounding box represented by a corresponding tile (e.g., Tile(n).tile_bounding_box_xyz0) and information about the width, height, and depth of the bounding box (e.g., Tile(n).tile_bounding_box_whd). The TPS 27004 may be referred to as a tile inventory.

When a plurality of tiles is present, the tile parameter set 27004 may include information indicating a bounding box for each of the tiles. For example, when each tile is indicated as 0 to n by the identifier information for the tiles, the information indicating the bounding box of each tile may be represented as Tile(0).tile_bounding_box_xyz0, Tile(0).tile_bounding_box_whd, Tile(1).tile_bounding_box_xyz0, Tile(1).tile_bounding_box_whd, and so on.

The slice 27005 may be a unit of encoding of the point cloud data by the point cloud data transmission device. The slice 27005 may be a unit including one geometry bitstream Geom00 and one or more attribute bitstreams Attr00 and Attr10.

The slice 27005 may include a geometry slice (Geom) 27005a representing geometry information about the point cloud data included in the slice, and one or more attribute slices (Attr) 27005b representing attribute information about the point cloud data included in the slice.

The geometry slice (Geom) 27005a includes geometry slice data (Geom_slice_data) 27005d including geometry information about the point cloud data, and a geometry slice header (GSH) (Geom_slice_header) 27005c including information about the geometry slice data.

The GSH 27005c contains information about the geometry slice data 27005d in the slice. For example, the GSH 27005c may contain a geometry parameter set identifier (geom_geom_parameter_set_id) for identifying the GPS 27002 representing the geometry information about the slice, and a geometry slice identifier (geom_slice_id) for identifying the geometry slice, geometry box origin information (geomBoxOrigin) indicating the origin of the box of the geometry slice data, information (geom_box_log2_scale) indicating a logarithmic scale of the geometry slice, and information (geom_num_points) related to the number of points in the geometry slice.

When the point cloud data bitstream according to the embodiments contains one or more tiles, the header of the geometry bitstream may further contain information (geom_tile_id) for identifying a tile including the geometry bitstream.

The attribute slice (Attr) 27005*a* includes attribute slice data (Attr_slice_data) containing attribute information about the point cloud data and an attribute slice header (ASH) (Attr_slice_header) 27005*c* containing information about the attribute slice data.

According to embodiments, parameters required to encode a point cloud may be newly defined as a parameter set and header information for the point cloud. For example, the parameters may be added to the attribute parameter set RBSP syntax in encoding attribute information, and be added to the tile_header syntax in performing tile-based encoding.

According to embodiments, the above-described parameters may be signaled on a tile-by-tile basis or a slice-by-slice basis. The above-described parameters may be signaled in the SPS, the GPS, the APS, or the tile inventory.

When the point cloud data according to the embodiments is transmitted on a slice-by-slice basis, the parameters shown in this figure according to the embodiments may be included in the APS including information on attribute information about each slice.

When the point cloud data according to the embodiments is transmitted on a slice-by-slice basis, the parameters shown in this figure according to the embodiments may be included in a geometry slice header (gsh).

When the point cloud data according to the embodiments is transmitted on a tile-by-tile basis, the parameters shown in this figure according to the embodiments may be included in the TPS including information on attribute information about each slice (or tile inventory).

The PCC transmission/reception method according to the embodiments may provide parameters for point cloud data for each unit such as a tile, geometry, an attribute, and/or a slice by providing the bitstream structure as described above. Accordingly, the PCC transmission/reception method according to the embodiments may provide point cloud compression coding with better compression efficiency and appropriate latency by signaling information required for coding of point cloud data according to each unit.

As the PCC transmission/reception method according to the embodiments provides the bitstream structure as described above, the decoding performance of the receiver may be enhanced for the attribute information about the point cloud data. In addition, more robust quantization may be implemented by signaling the SA-DCT transform, and accordingly a perceptual improvement in inverse transform performance may be provided at the output terminal of the decoder.

Figure 21:
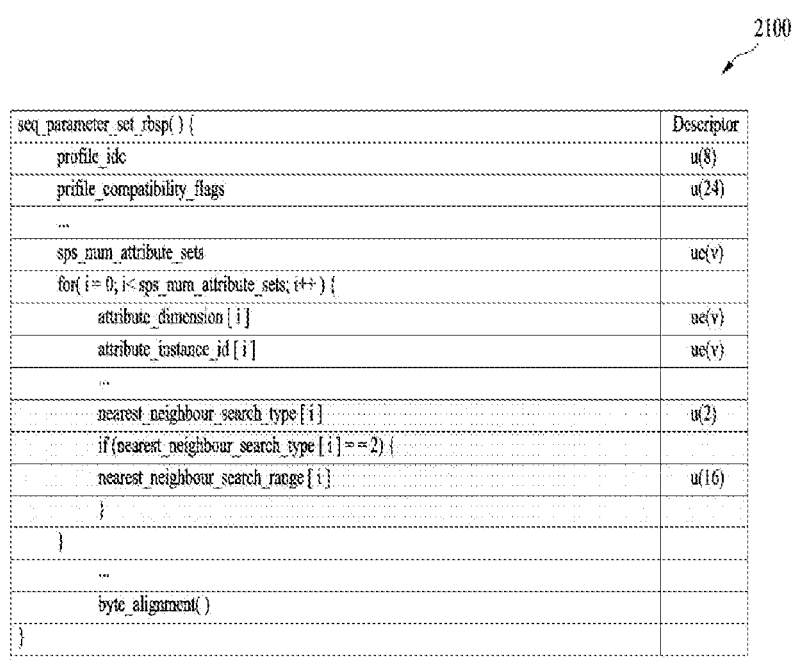
FIG. 21 shows a structure of a sequential parameter set (SPS) of point cloud data according to embodiments.

FIG. 21 shows a structure of a sequential parameter set (SPS) of point cloud data according to embodiments.

A bitstream of point cloud data according to embodiments may include a sequential parameter set (SPS) 2100 containing the signaling information (or flag) shown in this figure. The SPS 2100 shown in this figure may refer to the SPS 27001 described with reference to FIG. 20. The point cloud data receiver according to the embodiments may decode the point cloud data based on the signaling information (or flag information) described with reference to this figure.

profile_idc may represent information indicating a profile to which the bitstream conforms as specified in Annex A of the H.264 standard document. Bitstreams shall not contain values of profile_idc other than those specified in Annex A. Other values of profile_idc may be reserved for future use by ISO/IEC.

profile_compatibility_flags equal to 1, indicates that the bitstream conforms to the profile indicated by profile_idc equal to j as specified in Annex A. The value of profile_compatibility_flag[j] shall be equal to 0 for any value of j that is not specified as an allowed value of profile_idc in Annex A.

sps_num_attribute_sets indicates the number of coded attributes in the bitstream. The value of sps_num_attribute_sets may be in the range of 0 to 64.

attribute_dimension[i]) specifies the number of components of the i-th attribute. Index i may be greater than or equal to 0, and may be less than a value indicated by sps_num_attribute_sets.

attribute_instance_id[i] specifies attribute instance id.

The SPS according to the embodiments may include neighbor point set generation information (e.g., the neighbor point set property information described with reference to FIGS. 15 and 17 to 19). The neighbor point set generation information according to the embodiments represents information on generation of the neighbor point set described with reference to FIGS. 1 to 20.

The neighbor point set generation information according to the embodiments may include reference point selection type information (e.g., the reference point selection type information described with reference to FIGS. 17 to 19). The reference point selection type information represents information about a type of selection of a reference point (e.g., the reference point described with reference to FIGS. 17 to 19).

According to embodiments, reference points may be selected by the method described above with reference to FIGS. 17 to 19.

The reference points may be selected based on a Morton code value of the target point (e.g., the target point described with reference to FIGS. 15 to 19). The process in which reference points are selected based on the Morton code value of the target point is the same as or similar to the process described above with reference to FIG. 17. Based on the reference points being selected based on the Morton code value of the target point, the reference point selection type information may indicate Morton code value type information (e.g., 0).

The reference points may be selected based on a first shifted Morton code value of the target point (e.g., the target point described with reference to FIGS. 15 to 19). The process in which reference points are selected based on the Morton code value of the target point according to the embodiments is the same as or similar to the process described above with reference to FIG. 18. Based on the reference points being selected based on the Morton code value of the target point, the reference point selection type information according to the embodiments may specify the first shifted Morton code value type information (e.g., 1).

The reference points may be selected based on a second shifted Morton code value of the target point (e.g., the target point described with reference to FIGS. 15 to 19). The process in which reference points are selected based on the Morton code value of the target point according to the embodiments is the same as or similar to the process described above with reference to FIG. 19. Based on the reference points being selected based on the Morton code value of the target point, the reference point selection type information according to the embodiments may specify the second shifted Morton code value type information (e.g., 2).

When the reference point selection type information has the second shifted Morton code value type information, the neighbor point set generation information may further include information on a range value (e.g., the range value described above with reference to FIG. 19). The information on the range value may be an integer greater than or equal to 1 indicating a range value.

The signaling information included in the bitstream according to the embodiments may be generated by one or more elements in the metadata processor or the transmission processor (e.g., the metadata processing unit 12007 or the transmission processor 12012 of FIG. 12). The signaling information may be generated based on a result of geometry encoding and/or attribute encoding. The point cloud data transmission device according to the embodiments may transmit the bitstream in the above-described form, thereby increasing compression efficiency and reducing an image quality performance and a burden on the reception device.

FIG. 22 shows a structure of an attribute parameter set (APS) of point cloud data according to embodiments.

A bitstream of point cloud data according to embodiments may include an attribute parameter set 2200 including the signaling information (or flag) of this figure. The attribute parameter set 2200 of this figure may refer to the APS 27003 described with reference to FIG. 17. The point cloud data receiver according to the embodiments may decode the point cloud data based on the signaling information (or flag information) of this figure.

aps_attr_parameter_set_id may provide an identifier for the APS for reference by other syntax elements. The value of aps_attr_parameter_set_id shall be in the range of 0 to 15, inclusive.

aps_seq_parameter_set_id may specify the value of sps_seq_parameter_set_id for the active SPS. The value of aps_seq_parameter_set_id shall be in the range of 0 to 15, inclusive.

isLifting indicates whether the coding type for the attribute according to the embodiments is a method based on lifting. For example, isLifting indicates whether the coding type is predicting weight lifting or fixed weight lifting. isLifting may have a specific value (e.g., 0 or 1) to indicate whether the coding type for the attribute is a method based on the lifting. For example, when attr_coding_type is equal to 0 (i.e., the coding type for the attribute is predicting weight lifting) or 2 (i.e., the coding type for the attribute is fixed weight lifting), isLifting may be equal to 1 (namely, it may indicate that the coding type for the attribute is a method based on the lifting). For example, when attr_coding_type is equal to 1 (i.e., the coding type for the attribute is RAHT), isLifting may be 0 (namely, it may indicate that the coding type for the attribute is not a method based on the lifting).

When isLifting is equal to 1, the APS may include some or all of the parameters num_pred_nearest_neighbours, max_num_direct_predictors, lifting_search_range, lifting_quant_step_size, lifting_quant_step_size_chroma, lod_binary_tree_enabled_flag, and num_detail_levels_minus1. Also, when isLifting is equal to 1, the APS 30000 may include sampling_distance_squared information according to the value of num_detail_levels_minus1 (i.e., the number of LODs).

lifting_num_pred_nearest_neighbours specifies the maximum number of nearest neighbours to be used for prediction. The value of lifting_num_pred_nearest_neighbours may be in the range of 1 to xx.

lifting_max_num_direct_predictors specifies the maximum number of predictor to be used for direct prediction. The value of lifting_max_num_direct_predictors shall be in the range of 0 to num_pred_nearest_neighbours.

The APS according to the embodiments may include neighbor point set generation information (e.g., neighbor point set generation information described with reference to FIGS. 15 and 17 to 19). The neighbor point set generation information represents information on generation of the neighbor point set described with reference to FIGS. 1 to 20.

The information of different_nn_search_type_per_lod_flag may specify whether to use a different neighbor point set search method for each LOD (e.g., the LOD to which the target point of FIGS. 15 to 19 belongs). As described above with reference to FIGS. 17 to 19, the neighbor point set search method may be applied differently for each LOD.

When the information of different_nn_search_type_per_lod_flag indicates False as a value, the above-described neighbor point set generation information may include reference point selection type information that is equally applied to all LOD values. The reference point selection type information according to the embodiments is the same as that described with reference to FIG. 21.

When the information of different_nn_search_type_per_lod_flag does not indicate False as a value, the reference point set generation information identified by the value of idx may be included. The index idx is greater than or equal to 0 and less than the value indicated by num_detail_levels_minus1. The value of num_detail_levels_minus1 may specify the maximum number of LOD values constituting the LOD according to the embodiments. The reference point selection type information according to the embodiments is the same as that described with reference to FIG. 21.

nearest_neighbor_search_type_per_tile_flag may indicate whether the neighbor point set generation information is applied differently for each tile. When nearest_neighbor_search_type_per_tile_flag indicates "true" as a value, the TPS (e.g., the tile parameter set 28000 of FIG. 20) according to the embodiments may include neighbor point set generation information. When nearest_neighbor_search_type_per_tile_flag does not indicate True as a value, the TPS may not include neighbor point set generation information.

The signaling information included in the bitstream according to the embodiments may be generated by one or more elements in the metadata processor or the transmission processor (e.g., the metadata processing unit 12007 or the transmission processor 12012 of FIG. 12). The signaling information may be generated based on a result of geometry encoding and/or attribute encoding. The point cloud data transmission device according to the embodiments may transmit the bitstream in the above-described form, thereby increasing compression efficiency and reducing an image quality performance and a burden on the reception device.

FIG. 23 shows a structure of a tile parameter set (TPS) of point cloud data according to embodiments.

A bitstream of point cloud data according to embodiments may include a tile parameter set 2300 including the signaling information (or flag) shown in this figure. The tile parameter set 2300 shown in this figure may refer to the TPS 27004 described with reference to FIG. 20. The point cloud data receiver according to the embodiments may decode the point cloud data based on the signaling information (or flag information) illustrated in this figure.

The TPS 28000 may represent a syntax structure including syntax elements that apply to zero or more entire tiles (or encoded tiles).

num_tiles represents the number of tiles signaled for the bitstream. When not present, num_tiles may be inferred to be 0.

The TPS may include information about positions at which tiles present in the bitstream are located within a bounding box (e.g., tile_bounding_box_offset_x, tile_bounding_box_offset_y, tile_bounding_box_offset_z, etc.), scale factor information in the bounding box of tiles (e.g., tile_bounding_box_scale_factor, etc.), width or height information (e.g., tile_bounding_box_size_width, tile_bounding_box_size_height) about the bounding box of tiles.

Figure 27:
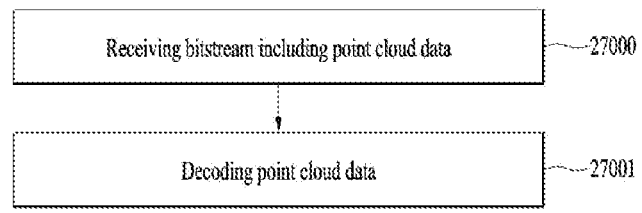
FIG. 27 is an exemplary flowchart illustrating a point cloud data reception method according to embodiments.

The TPS may include parameters (e.g., tile_bounding_box_offset_x and tile_bounding_box_offset_y) included in the for statement in this figure as many as the number of tiles. In FIG. 27, i may represent an index for each tile. tile_bounding_box_offset_x[i] and tile_bounding_box_offset_y[i] may represent tile_bounding_box_offset_x and tile_bounding_box_offset_y of the i-th tile in the for statement, respectively.

tile_bounding_box_offset_x[i] indicates the x offset of the i-th tile in the Cartesian coordinates. When the parameter is not present (namely, the tile_bounding_box_size_offset_x for the i-th tile that is not 0 is not present), the value of tile_bounding_box_offset_x[0] may be inferred to be sps_bounding_box_offset_x included in the SPS.

tile_bounding_box_offset_y[i] indicates the y offset of the i-th tile in the Cartesian coordinates. When the parameter is not present (namely, tile_bounding_box_size_offset_y for the i-th tile that is not 0 is not present), the value of tile_bounding_box_offset_y[0] may be inferred to be sps_bounding_box_offset_y included in the SPS.

When nearest_neighbor_search_type_per_tile_flag (e.g., nearest_neighbor_search_type_per_tile_flag of FIG. 22) indicates "true" as a value, the TPS according to the embodiments may include neighbor point set generation information. The neighbor point set generation information included in the TPS according to the embodiments is the same as that described with reference to FIGS. 21 and 22.

nearest_neighbor_search_type_per_slice_flag may indicate whether the neighbor point set generation information is applied differently for each slice (e.g., the slice of FIG. 12) generated by dividing a tile signaled by the TPS according to the embodiments. When nearest_neighbor_search_type_per_slice_flag indicates "true" as a value, the ASH (e.g., Attr_slice_header 27005c of FIG. 20) according to the embodiments may include neighbor point set generation information. When nearest_neighbor_search_type_per_slice_flag does not indicate True as a value, the ASH may not include the neighbor point set generation information.

The signaling information included in the bitstream according to the embodiments may be generated by one or more elements in the metadata processor or the transmission processor (e.g., the metadata processing unit 12007 or the transmission processor 12012 of FIG. 12). The signaling information may be generated based on a result of geometry encoding and/or attribute encoding. The point cloud data transmission device according to the embodiments may transmit the bitstream in the above-described form, thereby increasing compression efficiency and reducing an image quality performance and a burden on the reception device.

Figure 24:
FIG. 24 shows a structure of an attribute slice header (ASH) of point cloud data according to embodiments.

FIG. 24 shows a structure of Attr_slice_header (ASH) of point cloud data according to embodiments.

A bitstream of point cloud data according to embodiments may include attr_slice_header 2400 including the signaling information (or flag) shown in this figure. The attr_slice_header 2400 shown in this figure may refer to the attr_slice_header 27005c described with reference to FIG. 20. The point cloud data receiver according to the embodiments may decode the point cloud data based on the signaling information (or flag information) illustrated in this figure.

ash_attr_parameter_set_id has the same value as aps_attr_parameter_set_id of active APSs.

ash_attr_sps_attr_idx may specify the value of sps_seq_parameter_set_id for the active SPS. The value of ash_attr_sps_attr_idx is in the range of 0 to the value of sps_num_attribute_sets included in the active SPS.

ash_attr_geom_slice_id specifies the value of a geometry slice ID (e.g. geom_slice_id).

When nearest_neighbor_search_type_per_slice_flag (e.g., nearest_neighbor_search_type_per_slice_flag in FIG. 23) indicates "true" as a value, the ASH according to the embodiments may include neighbor point set generation information. The neighbor point set generation information included in the ASH according to the embodiments is the same as that described with reference to FIGS. 21 to 24.

The signaling information included in the bitstream according to the embodiments may be generated by one or more elements in the metadata processor or the transmission processor (e.g., the metadata processing unit 12007 or the transmission processor 12012 of FIG. 12). The signaling information may be generated based on a result of geometry encoding and/or attribute encoding. The point cloud data transmission device according to the embodiments may transmit the bitstream in the above-described form, thereby increasing compression efficiency and reducing an image quality performance and a burden on the reception device.

Figure 25:
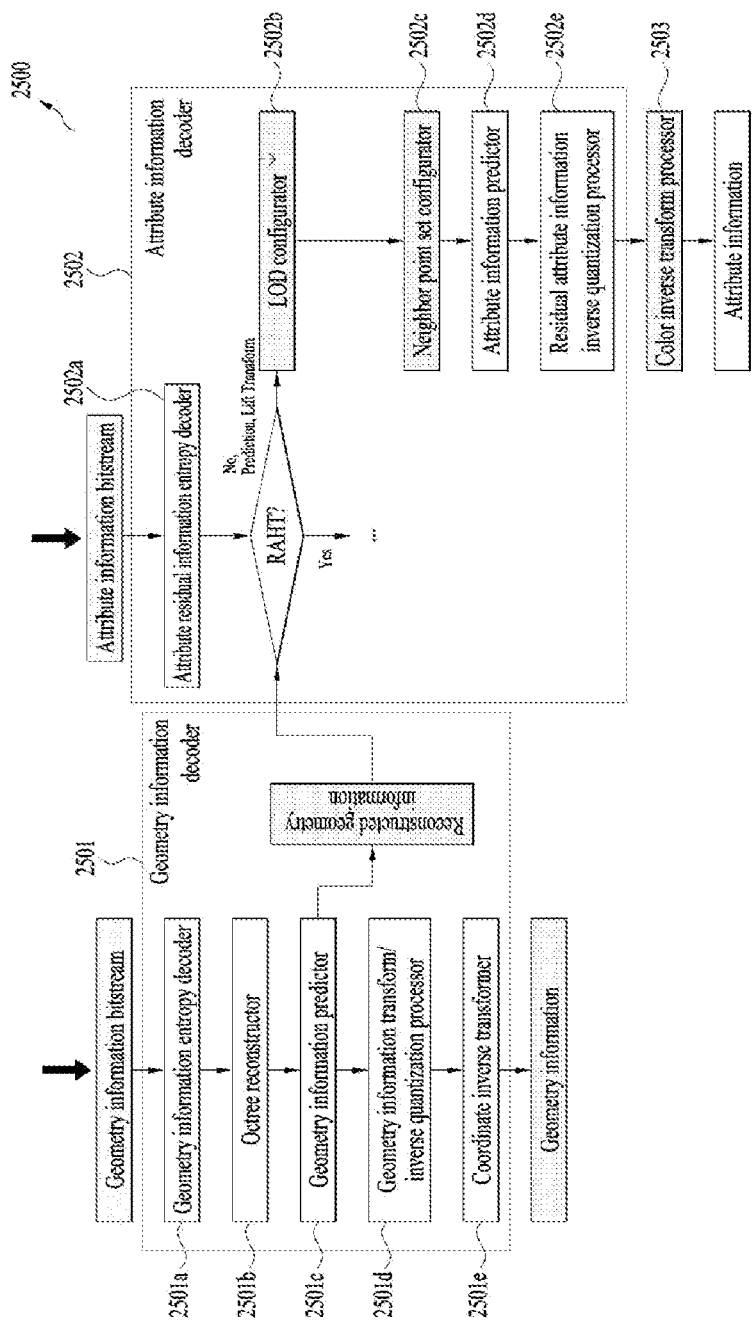
FIG. 25 is a block diagram illustrating a point cloud data reception device according to embodiments.

FIG. 25 is a block diagram illustrating a point cloud data reception device according to embodiments.

FIG. 25 is a block diagram illustrating the point cloud data reception device (e.g., the reception device 10004 of FIG. 1, the point cloud video decoder 10006 of FIG. 1, the decoder of FIG. 10, the reception device of FIG. 13, and the XR device 1430 of FIG. 14). The reception device 2500 according to the embodiments may perform the same or similar operation to the decoding operation described with reference to FIGS. 1 to 24, and may perform a reverse process of the operation of the transmission device of FIG. 15. The reception device 2500 may include a geometry information decoder 2501, an attribute information decoder 2502, and/or a color inverse transform processor 2503. Although not shown in FIG. 25, the reception device according to the embodiments may further include one or more elements configured to perform the same or similar operation to the decoding operation described with reference to FIGS. 1 to 24.

The geometry decoder according to the embodiments may receive a geometry information bitstream (e.g., the geometry bitstream of FIG. 2) and decode geometry information (e.g., the geometry described with reference to FIGS. 1 to 24). The geometry information decoder may perform a reverse process of the operation of the geometry information encoder 1505 of FIG. 15. The geometry information decoder may include a geometry information entropy encoder 2501a, an octree reconstructor 2501b, a geometry information predictor 2501c, a geometry information transform inverse quantization processor 2501d, and/or a coordinate inverse transformer 2501e. Although not shown in FIG. 25, the geometry information decoder may further include one or more elements configured to perform the same or similar operation to the geometry decoding operation described with reference to FIGS. 1 to 24.

The geometry information entropy decoder according to the embodiments may receive the geometry bitstream and decode the geometry information based on an entropy scheme. The geometry information entropy decoder may perform a reverse process of the operation of the geometry information entropy encoder 1505d of FIG. 15.

The octree reconstructor according to the embodiments may reconstruct an octree (e.g., the octree described with reference to FIGS. 1 to 24) from the geometry information.

The geometry information predictor according to the embodiments may generate a predicted value of the geometry information. For example, an inter-node predicted value may be generated in an octree structure, and the geometry information may be efficiently decoded using a residual of the predicted value. The geometry information predictor may perform a reverse process of the operation of the geometry information predictor 1505c of FIG. 15. A value generated in the prediction process by the geometry information predictor may be used in the geometry information reconstruction process.

The geometry information transform inverse quantization processor according to embodiments may inversely quantize the geometry data. For example, the geometry information transform inverse quantization processor may acquire a scale value (quantization value) from the signaling information (parameter) contained in the bitstream, and perform inverse quantization on the geometry information reconstructed based on the scale value. The geometry information transform inverse quantization processor may perform a reverse process of the operation of the geometry information transform quantization processor 1503 of FIG. 15.

The coordinate inverse transformer according to embodiments may inversely transform the coordinate information abut the geometry information. The coordinate inverse transformer may perform a reverse process of the operation of the coordinate transformer 1502 of FIG. 15.

The geometry information decoder according to the embodiments may perform a geometry reconstruction operation. The geometry reconstruction operation of the geometry information encoder is the same as or similar to the geometry reconstruction operation described with reference to FIG. 8. The geometry information decoder may transmit the reconstructed geometry information generated in the geometry reconstruction operation to the attribute information decoder.

The attribute information decoder may receive an attribute bitstream (e.g., the attribute bitstream of FIG. 2) and perform attribute information decoding (e.g., the attribute decoding described with reference to FIGS. 1 to 24). The attribute information decoder may perform a reverse process of the operation of the attribute information encoder 1506 of FIG. 15. The attribute information decoder may include an attribute residual information entropy decoder 2502a, an LOD configurator 2502b, a neighbor point set configurator 2502c, an attribute information predictor 2502d, and/or a residual attribute information inverse quantization processor 2502e. Although not shown in FIG. 25, the attribute information decoder may further include one or more elements configured to perform the same or similar operation to the attribute decoding operation described with reference to FIGS. 1 to 24. For example, the attribute information decoder may further include a Morton code generator (not shown in this figure). The Morton code generator may correspond to the Morton code generator described with reference to FIG. 15. The Morton code generator may generate Morton codes of points (e.g., the Morton codes described with reference to FIGS. 1 to 24).

The attribute residual information entropy decoder according to embodiments may decode the attribute residual (e.g., a residual value of the attribute information) included in the attribute bitstream based on the entropy scheme. The attribute residual information entropy decoder may perform a reverse process of the operation of the attribute information entropy encoder 1506g of FIG. 15.

According to embodiments, LOD configurator may generate an LOD (e.g., the LOD described with reference to FIGS. 1 to 24) from the point cloud data (e.g., reconstructed geometry information) obtained by performing predictive transform coding (e.g., the predictive transform coding of FIG. 4) rather than RAHT during attribute coding. The LOD configurator according to the embodiments may correspond to the LOD configurator 1506c of FIG. 15.

According to embodiments, the neighboring point set configurator may search for neighbor points of points included in the LODs based on the generated LOD and register the searched points as a neighbor point set (e.g., the neighbor point set described with reference to FIG. 24). The attribute information decoder (e.g., the neighbor point set configurator) may perform the neighbor point set generation process described with reference to FIGS. 17 to 19. The attribute information decoder may perform a neighbor point set generation process based on the received bitstream (e.g., the bitstream of FIGS. 20 to 24). For example, the attribute information decoder may select at least one reference point from among one or more points of the point cloud data based on the neighbor point set generation information included in the bitstream.

The attribute information encoder according to the embodiments may compare Morton code values of one or more points with the Morton code value of a target point to select a point having a Morton code value closest to the Morton code value of the target point based on the neighbor point set generation information (e.g., the Morton code value information of FIGS. 21 to 24). The attribute information encoder may search a set of neighbor points based on the selected reference point. The process of searching for neighbor points based on the Morton code value of the target point is the same as or similar to the process described above with reference to FIG. 17.

The attribute information encoder according to the embodiments may select points having a first shifted Morton code value such as the first shifted Morton code value of the target point as reference points based on the neighbor point set generation information (e.g., the reference point selection type information representing the first shifted Morton code value information of FIGS. 21 to 24). The attribute information encoder may search for a set of neighbor points based on the selected reference point. The process of searching for neighbor points based on the first shifted Morton code value of the target point is the same as or similar to the process described above with reference to FIG. 18.

The attribute information encoder according to the embodiments may select points having a second shifted Morton code value such as the second shifted Morton code value of the target point as reference points based on the neighbor point set generation information (e.g., the reference point selection type information representing the second shifted Morton code value information of FIGS. 21 to 24). The attribute information encoder may search for a set of neighbor points based on the selected reference point. The process of searching for neighbor points based on the first shifted Morton code value of the target point is the same as or similar to the process described above with reference to FIG. 19.

The attribute information predictor according to the embodiments may generate a predicted value for the attribute information. For example, a predicted value for a point may be generated from an LOD and a neighbor point set, and a residual value for the predicted value may be generated. The attribute information predictor may perform a reverse process of the operation of the attribute information predictor 1506f of FIG. 15.

The residual attribute information inverse quantization processor may inversely quantize the residual attribute information (e.g., the residual value of the attribute information). The residual attribute information inverse quantization processor may perform a reverse process of the operation of the residual attribute information quantization processor 1506g of FIG. 15 for the residual attribute information).

The inverse color transform processor according to the embodiments may inversely transform color information that is attribute information.

The point cloud data reception device according to the embodiments may output (or render) the final point cloud data based on the reconstructed geometry information and/or the reconstructed attribute information. In addition, the point cloud data reception device according to the embodiments In addition, the point cloud data reception device may perform a neighbor point search based on the neighbor point set generation information (e.g., the neighbor point set generation information included in the bitstream of FIGS. 20 to 24) to reduce complexity of attribute decoding and increase compression efficiency.

Figure 26:
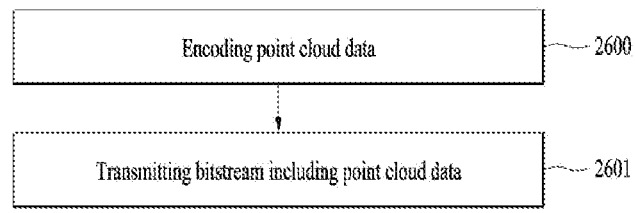
FIG. 26 is an exemplary flowchart illustrating a point cloud data transmission method according to embodiments.

FIG. 26 is an exemplary flowchart illustrating a point cloud data transmission method according to embodiments.

FIG. 26 illustrates a point cloud data transmission method of a point cloud data transmission device (e.g., the point cloud data transmission device described with reference to FIGS. 1, 2, 4, 11, 12, and 15). The transmission device performs the same or similar operation to the encoding operation described with reference to FIGS. 1 to 25.

A point cloud data transmission device according to the embodiments may encode point cloud data (2600). The point cloud data transmission device includes a geometry encoder configured to encode a geometry indicating a position of one or more points of the point cloud data, and an attribute encoder configured to encode an attribute of the one or more points. The geometry encoder may perform the geometry encoding operation described with reference to FIGS. 1 to 25. The geometry encoder may include an octree generator (e.g., the octree generator 1505b of FIG. 15) configured to generate an octree of a geometry. The octree generator generates the octree described in FIGS. 1 to 25. The octree may include one or more nodes each corresponding to each of one or more spaces generated by recursively dividing a bounding box containing points. Each node corresponds to any one of one or more levels of the octree. The one or more nodes may include a root node corresponding to the lowest one of the one or more levels, and a leaf node corresponding to the highest one of the one or more levels. The level corresponding to each of the nodes may represent the number of hops from the root node to each of the nodes. The attribute encoder may perform the attribute encoding process described with reference to FIGS. 1 to 25. The attribute encoder may include a Morton code generator (e.g., the Morton code generator described with reference to FIG. 15) configured to generate Morton codes for the one or more points, an LOD generator (e.g., the LOD configurator 1506c of FIG. 15) configured to generate one or more LODs by reorganizing the one or more points based on the octree, and/or a neighbor point set generator (e.g., the neighbor point set configurator 1506e of FIG. 15) configured to generate a neighbor point set for points belonging to each of the LODs. The attribute encoder according to embodiments may perform the process of generating the neighbor point set described with reference to FIGS. 17 to 19. The bitstream according to the embodiments may include the neighbor point set generation information described with reference to FIGS. 21 to 24.

According to embodiments, the neighbor point set may be generated based on at least one reference point selected from among the one or more points based on any one of a Morton code value of a target point targeted by the generation of the neighbor point set, a first shifted Morton code value of the target point, or a second shifted Morton code value of the target point. The at least one reference point may determine a range for generating the neighbor point set, the first shifted Morton code value may be shifted according to a first shifting value, and the second shifted Morton code value may be shifted according to a second shifting value. The neighbor point set generation information may include reference point selection type information indicating a method of selecting the at least one reference point among the one or more points. The target point, the reference point, the first shifting, the first shifting value, and the reference point selection type information according to the embodiments are the same as those described above with reference to FIGS. 15 to 25, and thus a detailed description thereof will be omitted.

According to embodiments, the reference point selected based on the Morton code value of the target point may be a point having a Morton code value closest to the Morton code value of the target point, based on the Morton code values of the one or more points being compared with the Morton code value of the target point. The reference point selection type information may indicate type information about the Morton code value. The target point, the selected reference point, and the type information about the Morton code value are the same as those described above with reference to FIGS. 15 to 25, and thus a detailed description thereof will be omitted.

According to embodiments, a value obtained by shifting a Morton code value of the at least one reference point selected based on the first shifted Morton code value of the target point according to the first shifting value may be equal to the first shifted Morton code value of the target point, and the first shifting value may be determined based on an LOD value of the target point. A node in a level lowered by 1 from the level of a node to which the target point belongs may be a parent node of the node to which the target point belongs. A space corresponding to the parent node may contain both the target point and the at least one selected reference point. The reference point selection type information may represent type information about the first shifted Morton code value. The target point, the selected reference point, the first shifting value, the parent node, the space corresponding to the parent node, and the first shifted Morton code value type information are the same as those described above with reference to FIGS. 15 to 25, and thus a detailed description thereof will be omitted.

According to embodiments, a value obtained by shifting a Morton code value of the at least one reference point selected based on the second shifted Morton code value of the target point according to the second shifting value may be equal to the second shifted Morton code value of the target point, and the second shifting value may be determined based on an LOD value of the target point and a value of a range. A node in a level lowered by a value equal to range+1 from the level of a node to which the target point belongs may be an upper node of the node to which the target point belongs, and a space corresponding to the upper node may contain both the target point and the at least one selected reference point. The reference point selection type information may represent type information about the second shifted Morton code value, and the neighbor point set generation information may further include information indicating the value of the range. The target point, the selected reference point, the second shifting value, the value of the range, the upper node, the space corresponding to the upper node, and the type information about the second shifted Morton code value are the same as those described above with reference to FIGS. 15 to 25, and thus a detailed description thereof will be omitted.

According to embodiments, a point cloud data transmission apparatus may transmit a bitstream including encoded point cloud data. The bitstream is the same as that described with reference to FIGS. 20 to 24, and thus a detailed description thereof will be omitted.

According to embodiments, the bitstream may include neighbor point set generation information (e.g., the neighbor point set generation information described with reference to FIGS. 21 to 24). In addition, the neighbor point set generation information may be transmitted through the SPS, APS, TPS, and/or ASH as described above with reference to FIGS. 21 to 24. However, embodiments are not limited to the above-described example.

FIG. 27 is an exemplary flowchart illustrating a point cloud data reception method according to embodiments.

FIG. 27 illustrates a method of transmitting point cloud data by a point cloud data reception apparatus (e.g., the point cloud data reception device described with reference to FIGS. 1, 2, 11, 13, and 25) according to embodiments. The transmission apparatus performs the same or similar operation to the decoding operation described with reference to FIGS. 1 to 25.

The point cloud data reception apparatus may receive a bitstream including point cloud data (2700). The bitstream is the same as that described with reference to FIGS. 20 to 26, and thus a detailed description thereof will be omitted.

The point cloud data reception apparatus may decode the point cloud data. The point cloud data reception apparatus may includes a geometry decoder configured to decode a geometry representing a position of one or more points of the point cloud data, and an attribute decoder configured to decode an attribute of the one or more points. The geometry decoder may perform the geometry decoding operation described with reference to FIGS. 1 to 25. The geometry decoder may include an octree generator (e.g., the octree reconstructor 2505*b* of FIG. 25) configured to generate an octree of the geometry. The octree generator generates the octree described with reference to FIGS. 1 to 25. According to embodiments, the octree may include one or more nodes corresponding to each of one or more spaces generated by recursively subdividing a bounding box including the points. Each of the nodes may correspond to any one of one or more levels of the octree, and the one or more nodes may include a root node corresponding to a lowest one of the one or more levels, and a leaf node corresponding to a highest one of the one or more levels. The level corresponding to each of the nodes may represent the number of hops from the root node to each of the nodes. The attribute decoder may perform the attribute decoding process described with reference to FIGS. 1 to 25. According to embodiments, the attribute decoder may include a Morton code generator (e.g., the Morton code Morton described with reference to FIG. 25), an LOD generator (e.g., the LOD configurator 2502*b* of FIG. 25) configured to generate one or more LODs by reorganizing the one or more points based on the octree, and a neighbor point set generator (the neighbor point set configurator 2502*c*) configured to generate a neighbor point set for points belonging to each of the LODs. The attribute decoder may perform the neighbor point set generation process described with reference to FIGS. 17 to 19. The bitstream may include the neighbor point set generation information described with reference to FIGS. 21 to 24.

The reference point selected based on the Morton code value of the target point may be a point having a Morton code value closest to the Morton code value of the target point, based on the Morton code values of the one or more points being compared with the Morton code value of the target point. The reference point selection type information may indicate type information about the Morton code value. The target point, the selected reference point, and the type information about the Morton code value are the same as those described above with reference to FIGS. 15 to 25, and thus a detailed description thereof will be omitted.

According to embodiments, a value obtained by shifting a Morton code value of the at least one reference point selected based on the first shifted Morton code value of the target point according to the first shifting value may be equal to the first shifted Morton code value of the target point, and the first shifting value may be determined based on an LOD value of the target point. A node in a level lowered by 1 from the level of a node to which the target point belongs may be a parent node of the node to which the target point belongs. A space corresponding to the parent node may contain both the target point and the at least one selected reference point. The reference point selection type information may represent type information about the first shifted Morton code value. The target point, the selected reference point, the first shifting value, the parent node, the space corresponding to the parent node, and the first shifted Morton code value type information are the same as those described above with reference to FIGS. 15 to 25, and thus a detailed description thereof will be omitted.

According to embodiments, a value obtained by shifting a Morton code value of the at least one reference point selected based on the second shifted Morton code value of the target point according to the second shifting value may be equal to the second shifted Morton code value of the target point, and the second shifting value may be determined based on an LOD value of the target point and a value of a range. A node in a level lowered by a value equal to range+1 from the level of a node to which the target point belongs may be an upper node of the node to which the target point belongs, and a space corresponding to the upper node may contain both the target point and the at least one selected reference point. The reference point selection type information may represent type information about the second shifted Morton code value, and the neighbor point set generation information may further include information indicating the value of the range. The target point, the selected reference point, the second shifting value, the value of the range, the upper node, the space corresponding to the upper node, and the type information about the second shifted Morton code value are the same as those described above with reference to FIGS. 15 to 25, and thus a detailed description thereof will be omitted.

Although the accompanying drawings have been described separately for simplicity, it is possible to design new embodiments by merging the embodiments illustrated in the respective drawings. Designing a recording medium readable by a computer on which programs for executing the above-described embodiments are recorded as needed by those skilled in the art also falls within the scope of the appended claims and their equivalents. The devices and methods according to embodiments may not be limited by the configurations and methods of the embodiments described above. Various modifications can be made to the embodiments by selectively combining all or some of the embodiments. Although preferred embodiments have been described with reference to the drawings, those skilled in the art will appreciate that various modifications and variations may be made in the embodiments without departing from the spirit or scope of the disclosure described in the appended claims. Such modifications are not to be understood individually from the technical idea or perspective of the embodiments.

Various elements of the devices of the embodiments may be implemented by hardware, software, firmware, or a combination thereof. Various elements in the embodiments may be implemented by a single chip, for example, a single hardware circuit. According to embodiments, the components according to the embodiments may be implemented as separate chips, respectively. According to embodiments, at least one or more of the components of the device according to the embodiments may include one or more processors capable of executing one or more programs. The one or more programs may perform any one or more of the operations/methods according to the embodiments or include instructions for performing the same. Executable instructions for performing the method/operations of the device according to the embodiments may be stored in a non-transitory CRM or other computer program products configured to be executed by one or more processors, or may be stored in a transitory CRM or other computer program products configured to be executed by one or more processors. In addition, the memory according to the embodiments may be used as a concept covering not only volatile memories (e.g., RAM) but also nonvolatile memories, flash memories, and PROMs. In addition, it may also be implemented in the form of a carrier wave, such as transmission over the Internet. In addition, the processor-readable recording medium may be distributed to computer systems connected over a network such that the processor-readable code may be stored and executed in a distributed fashion.

In this specification, the term "/" and "," should be interpreted as indicating "and/or." For instance, the expression "A/B" may mean "A and/or B." Further, "A, B" may mean "A and/or B." Further, "A/B/C" may mean "at least one of A, B, and/or C." Also, "A/B/C" may mean "at least one of A, B, and/or C." Further, in this specification, the term "or" should be interpreted as indicating "and/or." For instance, the expression "A or B" may mean 1) only A, 2) only B, or 3) both A and B. In other words, the term "or" used in this document should be interpreted as indicating "additionally or alternatively."

Terms such as first and second may be used to describe various elements of the embodiments. However, various components according to the embodiments should not be limited by the above terms. These terms are only used to distinguish one element from another. For example, a first user input signal may be referred to as a second user input signal. Similarly, the second user input signal may be referred to as a first user input signal. Use of these terms should be construed as not departing from the scope of the various embodiments. The first user input signal and the second user input signal are both user input signals, but do not mean the same user input signals unless context clearly dictates otherwise.

The terms used to describe the embodiments are used for the purpose of describing specific embodiments, and are not intended to limit the embodiments. As used in the description of the embodiments and in the claims, the singular forms "a", "an", and "the" include plural referents unless the context clearly dictates otherwise. The expression "and/or" is used to include all possible combinations of terms. The terms such as "includes" or "has" are intended to indicate existence of figures, numbers, steps, elements, and/or components and should be understood as not precluding possibility of existence of additional existence of figures, numbers, steps, elements, and/or components. As used herein, conditional expressions such as "if" and "when" are not limited to an optional case and are intended to be interpreted, when a specific condition is satisfied, to perform the related operation or interpret the related definition according to the specific condition.

MODE FOR DISCLOSURE

As described above, related contents have been described in the best mode for carrying out the embodiments.

INDUSTRIAL APPLICABILITY

As described above, the embodiments may be fully or partially applied to the point cloud data transmission/reception device and system.

It will be apparent to those skilled in the art that variously changes or modifications can be made to the embodiments within the scope of the embodiments.

Thus, it is intended that the embodiments cover the modifications and variations of this disclosure provided they come within the scope of the appended claims and their equivalents.

The invention claimed is:

1. A method of transmitting point cloud data by an apparatus, the method comprising:
   encoding a geometry representing a position of one or more points of the point cloud data;
   encoding an attribute of the one or more points of the point cloud data; and
   transmitting a bitstream including the geometry and the attribute,
   wherein the encoding the attribute includes generating level of details of the one or more points, wherein the one or more points are sorted based on Morton codes,
   wherein the encoding the attribute further includes generating neighbor points for the one or more points,
   wherein a position of a point in a level of the level of details is shifted.

2. The method of claim 1,
   wherein:
   the encoding of the geometry comprises:
   generating an octree of the geometry,
   wherein the octree includes one or more nodes corresponding to each of one or more spaces generated by recursively subdividing a bounding box including the points,
   wherein each of the nodes corresponds to any one of one or more levels of the octree, the one or more nodes including a root node corresponding to a lowest one of the one or more levels, and a leaf node corresponding to a highest one of the one or more levels, wherein the level corresponding to each of the nodes represents the number of hops from the root node to each of the nodes, wherein the bitstream includes neighbor point set generation information.

3. The method of claim 2, wherein a neighbor point set is generated based on at least one reference point selected from among the one or more points based on any one of a Morton code value of a target point targeted by the generation of the neighbor point set, a first shifted Morton code value of the target point, or a second shifted Morton code value of the target point, wherein the at least one reference point determines a range for generating the neighbor point set, the first shifted Morton code value is shifted according to a first shifting value, and the second shifted Morton code value is shifted according to a second shifting value, wherein the neighbor point set generation information includes reference point selection type information indicating a method of selecting the at least one reference point among the one or more points.

4. The method of claim 3, wherein the reference point selected based on the Morton code value of the target point is a point having a Morton code value closest to the Morton code value of the target point, based on the Morton code values of the one or more points being compared with the Morton code value of the target point, wherein the reference point selection type information indicates type information about the Morton code value.

5. The method of claim 3, wherein a value obtained by shifting a Morton code value of the at least one reference point selected based on the first shifted Morton code value of the target point according to the first shifting value is equal to the first shifted Morton code value of the target point, the first shifting value being determined based on a Level of Detail (LOD) value of the target point, wherein a node in a level lowered by 1 from a level of a node to which the target point belongs is a parent node of the node to which the target point belongs, wherein a space corresponding to the parent node contain both the target point and the at least one selected reference point, wherein the reference point selection type information represents type information about the first shifted Morton code value.

6. The method of claim 3, wherein a value obtained by shifting a Morton code value of the at least one reference point selected based on the second shifted Morton code value of the target point according to the second shifting value is equal to the second shifted Morton code value of the target point, the second shifting value being determined based on an LOD value of the target point and a value of a range, wherein a node in a level lowered by a value equal to range+1 from a level of a node to which the target point belongs is an upper node of the node to which the target point belongs, wherein a space corresponding to the upper node contain both the target point and the at least one selected reference point, wherein the reference point selection type information represents type information about the second shifted Morton code value, wherein the neighbor point set generation information further includes information indicating the value of the range.

7. An apparatus for transmitting point cloud data, comprising:

an encoder configured to encode point cloud data, the encoder comprising:

a geometry encoder configured to encode a geometry representing a position of one or more points of the point cloud data; and an attribute encoder configured to encode an attribute of the one or more points, wherein:

the geometry encoder comprises:

an octree generator configured to generate an octree of the geometry; and the attribute encoder comprises:

a Morton code generator configured to generate Morton codes for the one or more points;

a Level of Detail (LOD) generator configured to generate one or more LODs by reorganizing the one or more points based on the octree; and a neighbor point set generator configured to generate a neighbor point set for points belonging to each of the LODs, wherein a position of a point in a LOD is shifted.

8. The apparatus of claim 7, wherein the octree includes one or more nodes corresponding to each of one or more spaces generated by recursively subdividing a bounding box including the points, wherein each of the nodes corresponds to any one of one or more levels of the octree, the one or more nodes including a root node corresponding to a lowest one of the one or more levels, and a leaf node corresponding to a highest one of the one or more levels, wherein the level corresponding to each of the nodes represents a number of hops from the root node to each of the nodes, wherein a bitstream includes neighbor point set generation information, wherein a neighbor point set is generated based on at least one reference point selected from among the one or more points based on any one of a Morton code value of a target point targeted by the generation of the neighbor point set, a first shifted Morton code value of the target point, or a second shifted Morton code value of the target point, wherein the at least one reference point determines a range for generating the neighbor point set, the first shifted Morton code value is shifted according to a first shifting value, and the second shifted Morton code value is shifted according to a second shifting value, wherein the neighbor point set generation information includes reference point selection type information indicating a method of selecting the at least one reference point among the one or more points.

9. The apparatus of claim 8, wherein a value obtained by shifting a Morton code value of the at least one reference point selected based on the first shifted Morton code value of the target point according to the first shifting value is equal to the first shifted Morton code value of the target point, the first shifting value being determined based on an LOD value of the target point, wherein a node in a level lowered by 1 from a level of a node to which the target point belongs is a parent node of the node to which the target point belongs, wherein a space corresponding to the parent node contain both the target point and the at least one selected reference point, wherein the reference point selection type information represents type information about the first shifted Morton code value.

10. The apparatus of claim 8, wherein a value obtained by shifting a Morton code value of the at least one reference point selected based on the second shifted Morton code value of the target point according to the second shifting value is equal to the second shifted Morton code value of the target point, the second shifting value being determined based on an LOD value of the target point and a value of a range,
- wherein a node in a level lowered by a value equal to range+1 from a level of a node to which the target point belongs is an upper node of the node to which the target point belongs,
- wherein a space corresponding to the upper node contain both the target point and the at least one selected reference point,
- wherein the reference point selection type information represents type information about the second shifted Morton code value,
- wherein the neighbor point set generation information further includes information indicating the value of the range.

11. A method of receiving point cloud data by an apparatus, the method comprising:
- receiving a bitstream including point cloud data; and
- decoding a geometry representing a position of one or more points of the point cloud data;
- decoding an attribute of the one or more points of the point cloud data,
- wherein the decoding the attribute includes generating level of details of the one or more points, wherein the one or more points are sorted based on Morton codes,
- wherein the decoding the attribute further includes generating neighbor points for the one or more points,
- wherein a position of a point in a level of the level of details is shifted.

12. The method of claim 11,
wherein:
- the decoding of the geometry comprises generating an octree of the geometry,
- wherein the octree includes one or more nodes corresponding to each of one or more spaces generated by recursively subdividing a bounding box including the points,
- wherein each of the nodes corresponds to any one of one or more levels of the octree, the one or more nodes including a root node corresponding to a lowest one of the one or more levels, and a leaf node corresponding to a highest one of the one or more levels,
- wherein the level corresponding to each of the nodes represents the number of hops from the root node to each of the nodes,
- wherein the bitstream includes neighbor point set generation information.

13. The method of claim 12, wherein a neighbor point set is generated based on at least one reference point selected from among the one or more points based on any one of a Morton code value of a target point targeted by the generation of the neighbor point set, a first shifted Morton code value of the target point, or a second shifted Morton code value of the target point,
- wherein the at least one reference point determines a range for generating the neighbor point set, the first shifted Morton code value is shifted according to a first shifting value, and the second shifted Morton code value is shifted according to a second shifting value,
- wherein the neighbor point set generation information includes reference point selection type information indicating a method of selecting the at least one reference point among the one or more points.

14. The method of claim 13, wherein the reference point selected based on the Morton code value of the target point is a point having a Morton code value closest to the Morton code value of the target point, based on the Morton code values of the one or more points being compared with the Morton code value of the target point,
- wherein the reference point selection type information indicates type information about the Morton code value.

15. The method of claim 13, wherein a value obtained by shifting a Morton code value of the at least one reference point selected based on the first shifted Morton code value of the target point according to the first shifting value is equal to the first shifted Morton code value of the target point, the first shifting value being determined based on a level of Detail (LOD) value of the target point,
- wherein a node in a level lowered by 1 from a level of a node to which the target point belongs is a parent node of the node to which the target point belongs,
- wherein a space corresponding to the parent node contain both the target point and the at least one selected reference point,
- wherein the reference point selection type information represents type information about the first shifted Morton code value.

16. The method of claim 13, wherein a value obtained by shifting a Morton code value of the at least one reference point selected based on the second shifted Morton code value of the target point according to the second shifting value is equal to the second shifted Morton code value of the target point, the second shifting value being determined based on an LOD value of the target point and a value of a range,
- wherein a node in a level lowered by a value equal to range+1 from a level of a node to which the target point belongs is an upper node of the node to which the target point belongs,
- wherein a space corresponding to the upper node contain both the target point and the at least one selected reference point,
- wherein the reference point selection type information represents type information about the second shifted Morton code value,
- wherein the neighbor point set generation information further includes information indicating the value of the range.

17. An apparatus for receiving point cloud data, comprising:
- a receiver configured to receive a bitstream including point cloud data; and
- a decoder configured to decode the point cloud data, the decoder comprising:
- a geometry decoder configured to decode a geometry representing a position of one or more points of the point cloud data; and
- an attribute decoder configured to decode an attribute of the one or more points,
wherein:
the geometry decoder comprises:
an octree generator configured to generate an octree of the geometry; and the attribute decoder comprises:

a Morton code generator configured to generate Morton codes for the one or more points;

an Level of Detail (LOD) generator configured to generate one or more LODs by reorganizing the one or more points based on the octree; and a neighbor point set generator configured to generate a neighbor point set for points belonging to each of the LODs, wherein a position of a point in a LOD is shifted.

18. The apparatus of claim 17, wherein the octree includes one or more nodes corresponding to each of one or more spaces generated by recursively subdividing a bounding box including the points, wherein each of the nodes corresponds to any one of one or more levels of the octree, the one or more nodes including a root node corresponding to a lowest one of the one or more levels, and a leaf node corresponding to a highest one of the one or more levels, wherein the level corresponding to each of the nodes represents a number of hops from the root node to each of the nodes, wherein the bitstream includes neighbor point set generation information, wherein a neighbor point set is generated based on at least one reference point selected from among the one or more points based on any one of a Morton code value of a target point targeted by the generation of the neighbor point set, a first shifted Morton code value of the target point, or a second shifted Morton code value of the target point, wherein the at least one reference point determines a range for generating the neighbor point set, the first shifted Morton code value is shifted according to a first shifting value, and the second shifted Morton code value is shifted according to a second shifting value, wherein the neighbor point set generation information includes reference point selection type information indicating a method of selecting the at least one reference point among the one or more points.

19. The apparatus of claim 18, wherein a value obtained by shifting a Morton code value of the at least one reference point selected based on the first shifted Morton code value of the target point according to the first shifting value is equal to the first shifted Morton code value of the target point, the first shifting value being determined based on an LOD value of the target point, wherein a node in a level lowered by 1 from a level of a node to which the target point belongs is a parent node of the node to which the target point belongs, wherein a space corresponding to the parent node contain both the target point and the at least one selected reference point, wherein the reference point selection type information represents type information about the first shifted Morton code value.

20. The apparatus of claim 18, wherein a value obtained by shifting a Morton code value of the at least one reference point selected based on the second shifted Morton code value of the target point according to the second shifting value is equal to the second shifted Morton code value of the target point, the second shifting value being determined based on an LOD value of the target point and a value of a range, wherein a node in a level lowered by a value equal to range+1 from a level of a node to which the target point belongs is an upper node of the node to which the target point belongs, wherein a space corresponding to the upper node contain both the target point and the at least one selected reference point, wherein the reference point selection type information represents type information about the second shifted Morton code value, wherein the neighbor point set generation information further includes information indicating the value of the range.

* * * * *